(12) United States Patent
Reardon

(10) Patent No.: US 11,947,788 B1
(45) Date of Patent: Apr. 2, 2024

(54) DRAG AND DROP INTERACTIONS FOR AN OBJECT TRACKING SOFTWARE APPLICATION

(71) Applicants: Atlassian Pty Ltd., Sydney (AU); Atlassian US, Inc., San Francisco, CA (US)

(72) Inventor: Alexander James Reardon, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/956,607

(22) Filed: Sep. 29, 2022

(51) Int. Cl.
 *G06F 3/048* (2013.01)
 *G06F 3/0482* (2013.01)
 *G06F 3/0486* (2013.01)

(52) U.S. Cl.
 CPC .......... *G06F 3/0486* (2013.01); *G06F 3/0482* (2013.01)

(58) Field of Classification Search
 CPC .............................. G06F 3/0486; G06F 3/0482
 See application file for complete search history.

(56) References Cited

U.S. PATENT DOCUMENTS

| | | | | |
|---|---|---|---|---|
| 2012/0185789 | A1* | 7/2012 | Louch | G06F 3/0488 715/769 |
| 2017/0315716 | A1* | 11/2017 | Zambetti | G06F 3/0488 |
| 2020/0004387 | A1* | 1/2020 | Kim | G06F 3/0488 |

* cited by examiner

*Primary Examiner* — Aleksey Olshannikov
(74) *Attorney, Agent, or Firm* — Brownstein Hyatt Farber Schreck, LLP

(57) ABSTRACT

Systems, methods, and computer readable medium for determining a current drop target during a drag and drop operation are disclosed. The method includes during the drag and drop operation, detecting an event that indicates that a draggable item has moved. The method further includes determining whether a previous location of the draggable item was over a first drop target prior to the detected event, and determining whether a current location of the draggable item is over a second drop target. The method further includes determining whether to continue selecting the first drop target as the current drop target or to select the second drop target as the current drop target depending on the previous and current location of the draggable item, and a stickiness of the first drop target.

18 Claims, 16 Drawing Sheets

DRAG AND DROP INTERACTIONS FOR AN OBJECT TRACKING SOFTWARE APPLICATION

FIELD

Aspects of the present disclosure are directed to graphical user interfaces, and in particular, to improved drag and drop animations in graphical user interfaces of object tracking applications.

BACKGROUND

Background information described in this specification is background information known to the inventors. Reference to this information as background information is not an acknowledgment or suggestion that this background information is prior art or is common general knowledge to a person of ordinary skill in the art.

Graphical user interfaces allow users to interact with a software program or application. Traditionally, users may enter text or provide other user input to various regions or fields of a graphical user interface. Menu controls, buttons, or other similar items may also be used to provide input through a graphical user interface. Using some traditional graphical user interfaces, it can be difficult or inefficient to provide input using traditional fields or menu controls. The techniques described herein can be used to improve the effectiveness and efficiency of graphical user interfaces, particularly for object tracking software applications.

SUMMARY

Example embodiments described herein are directed to a computer-implemented method for determining a current drop target during a drag and drop operation. The method includes during the drag and drop operation, detecting an event that indicates that a draggable item has moved. The method further includes determining whether a previous location of the draggable item was over a first drop target prior to the detected event, and determining whether a current location of the draggable item is over a second drop target. The method further includes determining whether to continue selecting the first drop target as the current drop target or to select the second drop target as the current drop target depending on the previous and current location of the draggable item, and a stickiness of the first drop target.

Some example embodiments are directed to a computer processing system including a processing unit, a browser application executing on the computer processing system, and a non-transitory computer-readable storage medium storing instructions. When these instructions are executed by the processing unit, they cause the browser application to perform the computer-implemented method described above.

Still other example embodiments are directed to a non-transitory storage medium storing instructions executable by processing unit to cause a browser application to perform the computer-implemented method described above.

Figure 1A:
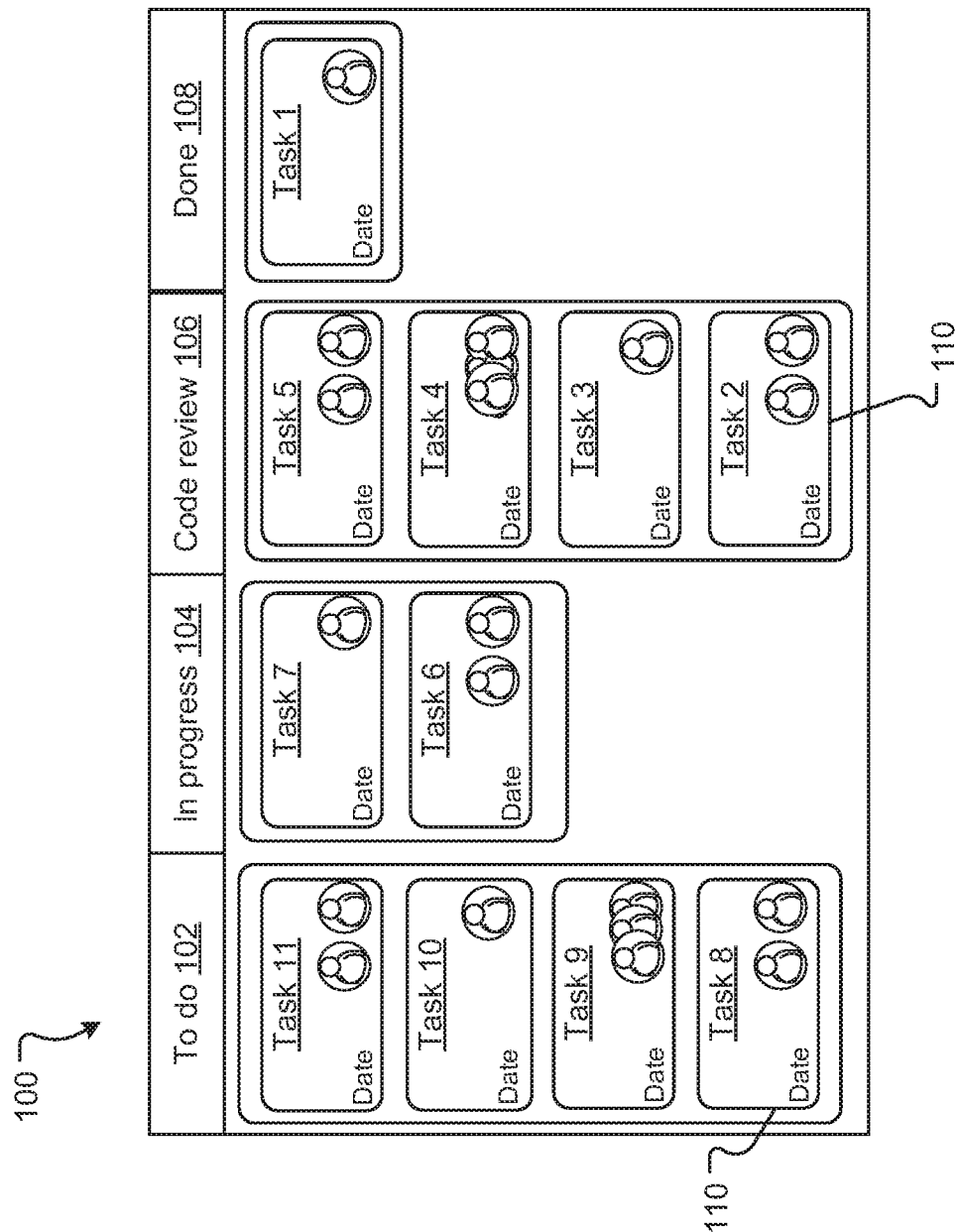
FIG. 1A is a diagram of an example virtual board.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Drag and drop (DND) is an interaction functionality applied to graphical user interfaces and in particular to web pages that allows users to move elements on a web page. In particular, it is an interaction functionality that allows a user to select an element, drag the element to a desired "drop location," and then drop the element at that location.

Generally speaking, there are a few different methods for displaying a DND animation in web pages. However, it is desirable to have an improved DND animation that addresses at least some of the limitations of conventional DND animations. For instance, the presently disclosed DND animations are described with reference to object tracking systems and or webpages that display lists or virtual boards. However, it will be appreciated that this is merely exemplary and that the presently disclosed DND animations can be used with any computer programs or systems that create webpages in which elements (also interchangeably called objects in this disclosure) can be dragged and dropped.

Overview

Generally speaking, various computing applications and systems (such as object tracking systems) provide mechanisms for creating and rendering objects, object states, and transitioning objects between states within a virtual board environment.

As used herein, an object tracking system (or object tracking application) is any system (or application) that at least facilitates the tracking of objects between states and the visualization of objects in object states by generation, rendering and display of virtual boards.

One example of an object tracking application (as referred to in the present context) is Trello. Trello allows users to create objects in the forms of cards or objects and object states in the form of lists or columns. In order to change an object state in Trello an object is transitioned from one list to another. For example, a Trello user may set up a virtual board (a list of lists) having one or more lists such as "To Do," "In Progress," and "Completed." A user may then create cards in respect of particular tasks that need to be done and add them to the "To Do" list: for example, a "grocery shopping" card, a "washing up" card, an "organize house party" card, etc.

A further example of what the present disclosure refers to as an object tracking application is Jira. Jira allows users to create objects in various forms, for example, issues or, more generally, work items. A work item in Jira is an object with associated information and an associated workflow that is a series of states through which the work item transitions over its lifecycle. Any desired workflow may be defined for a given type of work item. Further examples of what the present disclosure refers to as an object tracking application are Bugzilla, and Asana, to name but a few.

Object tracking applications such as those described above often provide graphical user interfaces for displaying the current state of objects maintained by the application and allowing users to move objects (e.g., tasks in Trello, work items in Jira) between states (or lists). In both Trello and Jira such graphical user interfaces are referred to as virtual boards. A board (also interchangeably referred to as a virtual board herein) is generally a tool for workflow visualization. Generally speaking, a board includes cards, columns, and/or swimlanes to visualize workflows in an effective manner. Each card in the board may be a visual representation of an object (e.g., task in Trello, work item in Jira) and may include information about the object, such as deadlines, assignee, description, etc. Each column in the board represents a different state (e.g., stage of a workflow in Jira or a list in Trello). The cards typically progress through the columns until their completion. Swimlanes are horizontal lanes that can be used to separate different activities, teams, classes or services, etc.

FIG. 1A provides an example virtual board 100, which shows a workflow to track software development projects. In particular, the board 100 includes four lists or columns, each corresponding to a workflow state: TO DO 102; IN PROGRESS 104; CODE REVIEW 106; and DONE 108. Board 100 also includes several cards 110, i.e., visual representations of objects (work items in the present context), each of which is in a particular column according to the current state of the object. Each card may include information about the underlying object—e.g., it may include an object title and description, a date by which the object is to be completed or was completed, and information about one or more users assigned to complete the object. It may include other content as well, including, but not limited to: text; icons; pictures; and video.

Typically, the cards/objects 110 displayed in a virtual board are interactive and/or 'draggable.' That is, these cards can be moved from one location to another in the virtual board based on user input control, e.g., via a mouse, or touchscreen. Further, the columns in the virtual boards are themselves 'draggable' and also 'droppable.' That is, a user can re-arrange the lists/columns in any desired order by dragging and dropping the lists on the user interface and the area of the user interface occupied by a given column is a droppable area in which draggable cards/object 110 can be dropped. Accordingly, users can move cards around within a particular column, for example by selecting and dragging or other means, to change the order of cards in the column. When a card is moved within a list, the state of the card does not change. For example, a card that is positioned at the top of a list can be moved to a chosen position lower down that same list such that the state of the card does not change, only the position of the card within the state is changed.

Further, users can transition cards between columns/lists, for example by selecting and dragging, from its current column to another one. For example, once the user has completed task 11 (in the virtual board 100 shown in FIG. 1), the user can select and drag the corresponding card from the "To Do" list and drop it into the "Completed" list. If the user has started but not completed work on this task they can instead select and drag the corresponding card from the "To Do" list to be dropped into the "In Progress" list.

Figure 1B:
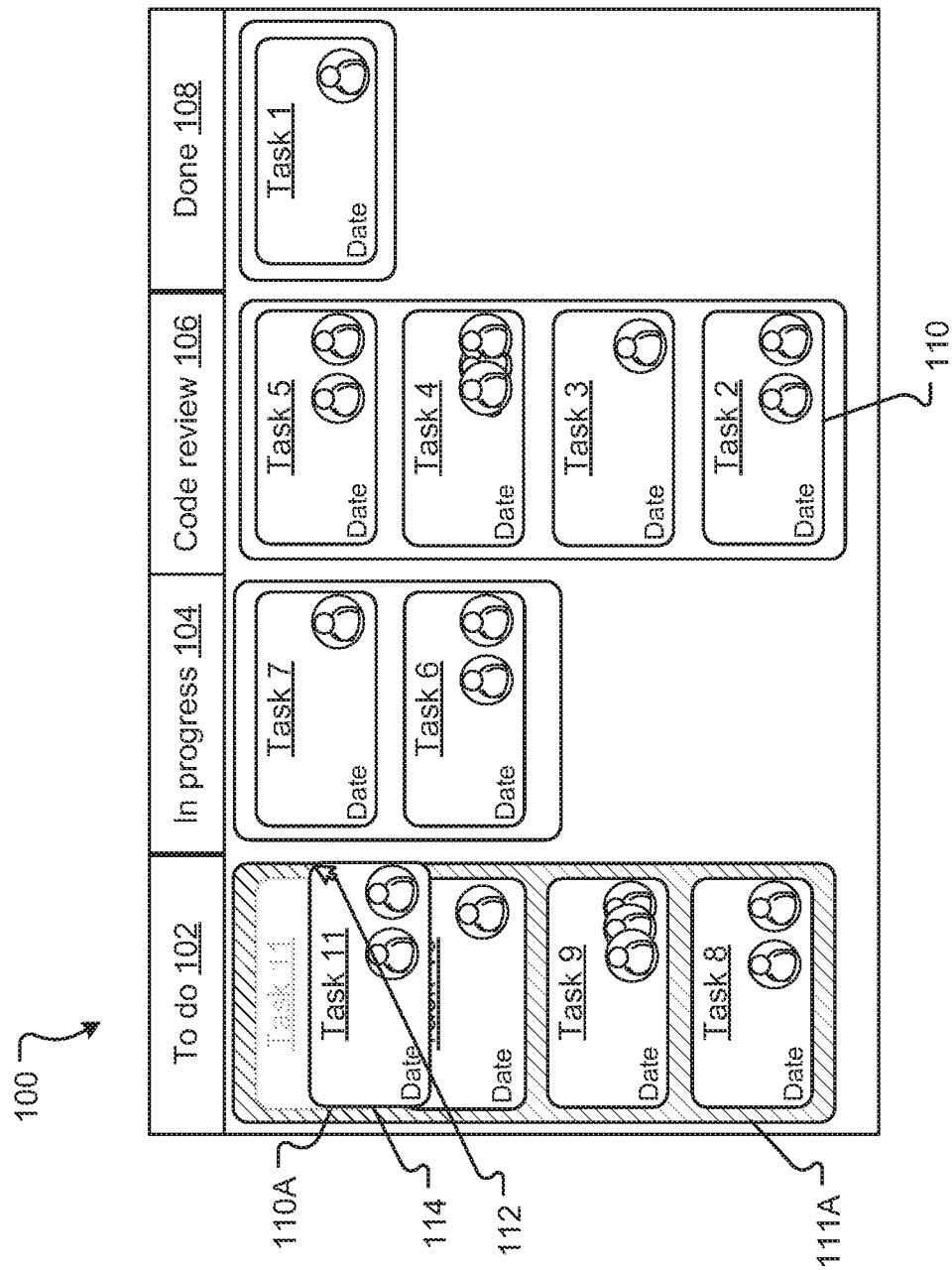
FIGS. 1B-1D are diagrams showing an example virtual board during an example DND operation at three different points in time.
Figure 1C:
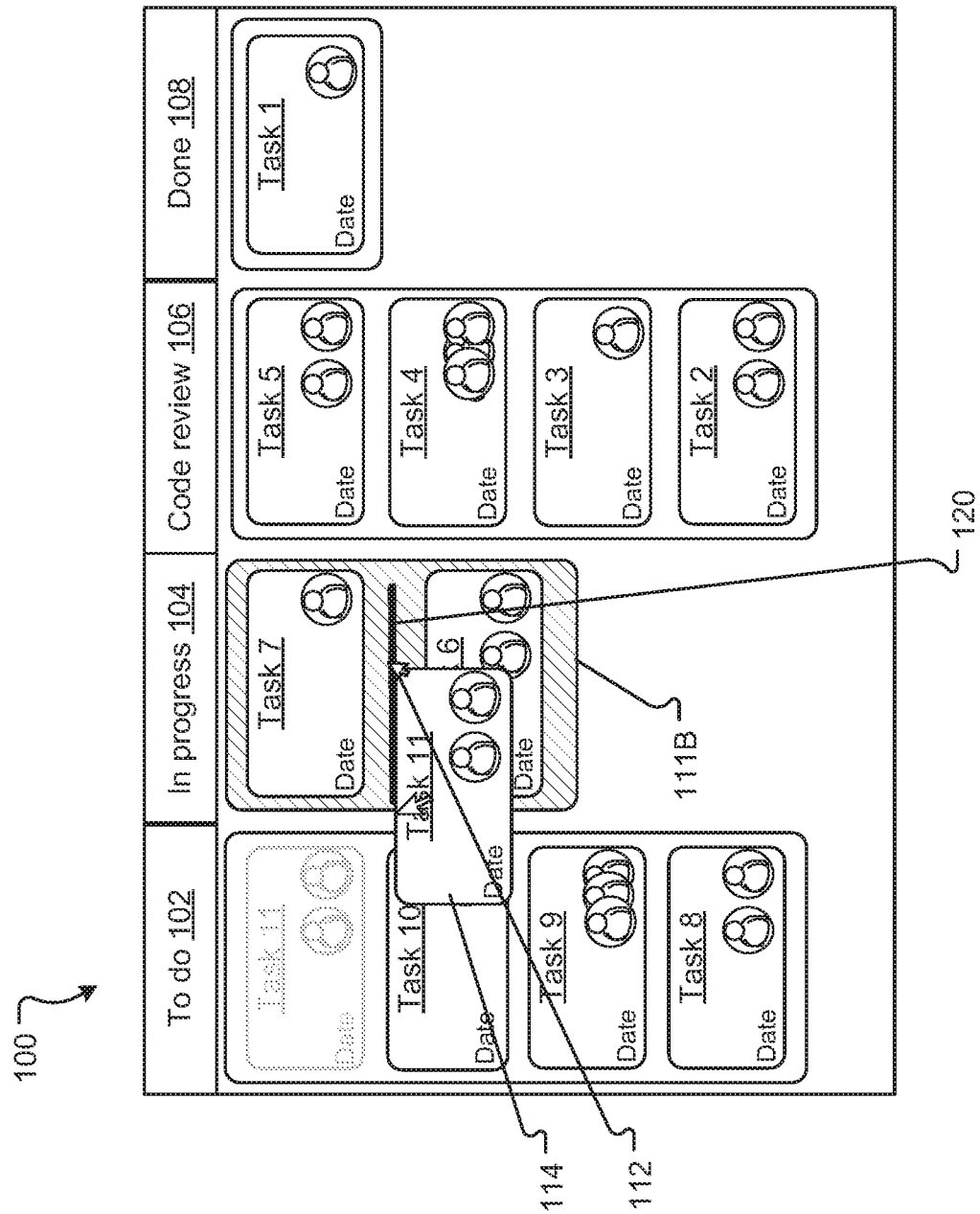
Figure 1D:
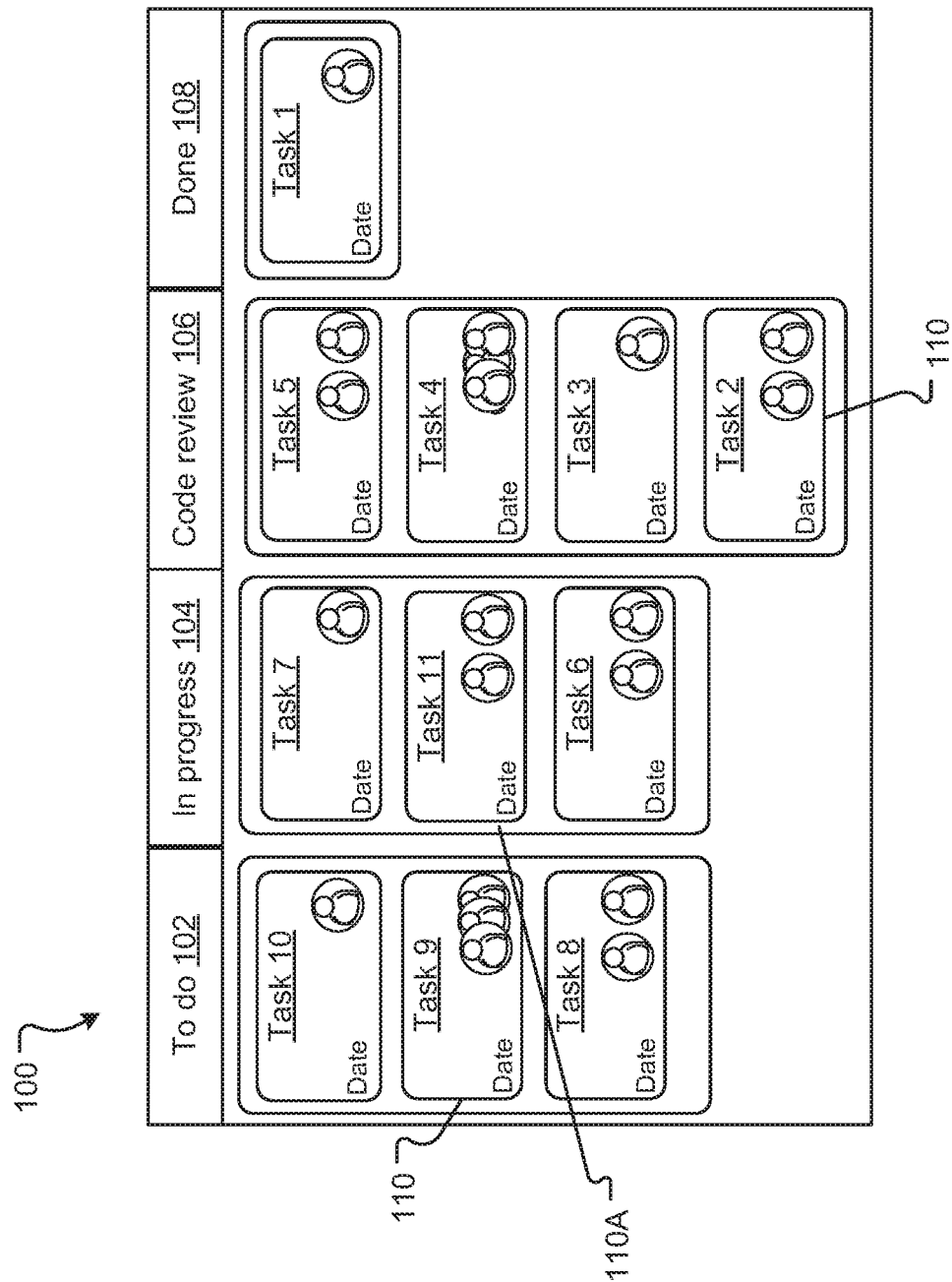

Typically, when a user drags a card from one location to another using an input control, the transition of the card from the first location to the second is animated and other objects in the destination can be animated to move out of the way of the dragged object so that it can be dropped at the desired destination. FIGS. 1B-1D depict this animation.

In particular, FIG. 1B, shows the board 100 at a first point in time, where the user has initiated a DND operation on card 110A by selecting card 110A with a cursor 112 and dragging card 110A from its original position in column 102. As the card 110A is selected, the translucency of the card 110A is increased but it remains in its original location while a ghost image 114 having a lower translucency is displayed and attached to the cursor position 112 and moves along with the cursor. The cursor 112 at this stage still hovers over a droppable area 111A overlaying column 102 and has not yet moved into a droppable area overlaying another list on the board. At this stage, the user interface shows card 110A is moved (e.g., by a distance that corresponds to the distance by which the cursor 112 has moved from its original position when the drag operation started to its current position), and highlights the droppable area 111A of the TO DO list (e.g., in a color).

FIG. 1C, shows the board 100 at a second point in time, where the user has dragged cursor 112 and the attached ghost card 114 such that cursor 112 is now hovering over a droppable area 111B overlaying column 104. In response to this, the user interface stops highlighting the droppable area 111A and highlights droppable area 111B overlaying column 104. Further, the user interface shows a visible marker (e.g., line 120) in column 104 at the position of the cursor 112.

FIG. 1D shows board 100 at a third point in time, where the user has dropped (that is, deselected by cursor 112) card 110A at the position shown in FIG. 1C between the location of cards representing 'TASK 7' and 'TASK 6.' Card 110A is therefore deleted from its original location, and displayed in the new location on this list. The ghost image is deleted, and tasks 10, 9, and 8 move up by one place in column 102. The DND operation then ends. This completion of the DND operation is also referred to as a card transition.

The animation sequence described above improves user experience when dragging and dropping objects within a virtual board and allows users to feel like they are moving physical objects around.

However, as discussed above, the system determines where a dragged object is at any given point depending on the position of the cursor 112. When the cursor is dragged over the edge of a droppable object and into it, e.g., a list in the example described and illustrated in FIGS. 1A-1D, the droppable object is selected as a drop target and highlighted. When the cursor is dragged over the edge of the droppable object and away from it, the droppable object is deselected and un-highlighted. This may be appropriate in some situations, e.g., where a single droppable area is presented in a webpage, and a user drags objects into that droppable area. However, this selection and deselection may provide a poor user experience in the case of nested objects, such as lists or virtual boards.

Figure 1E:
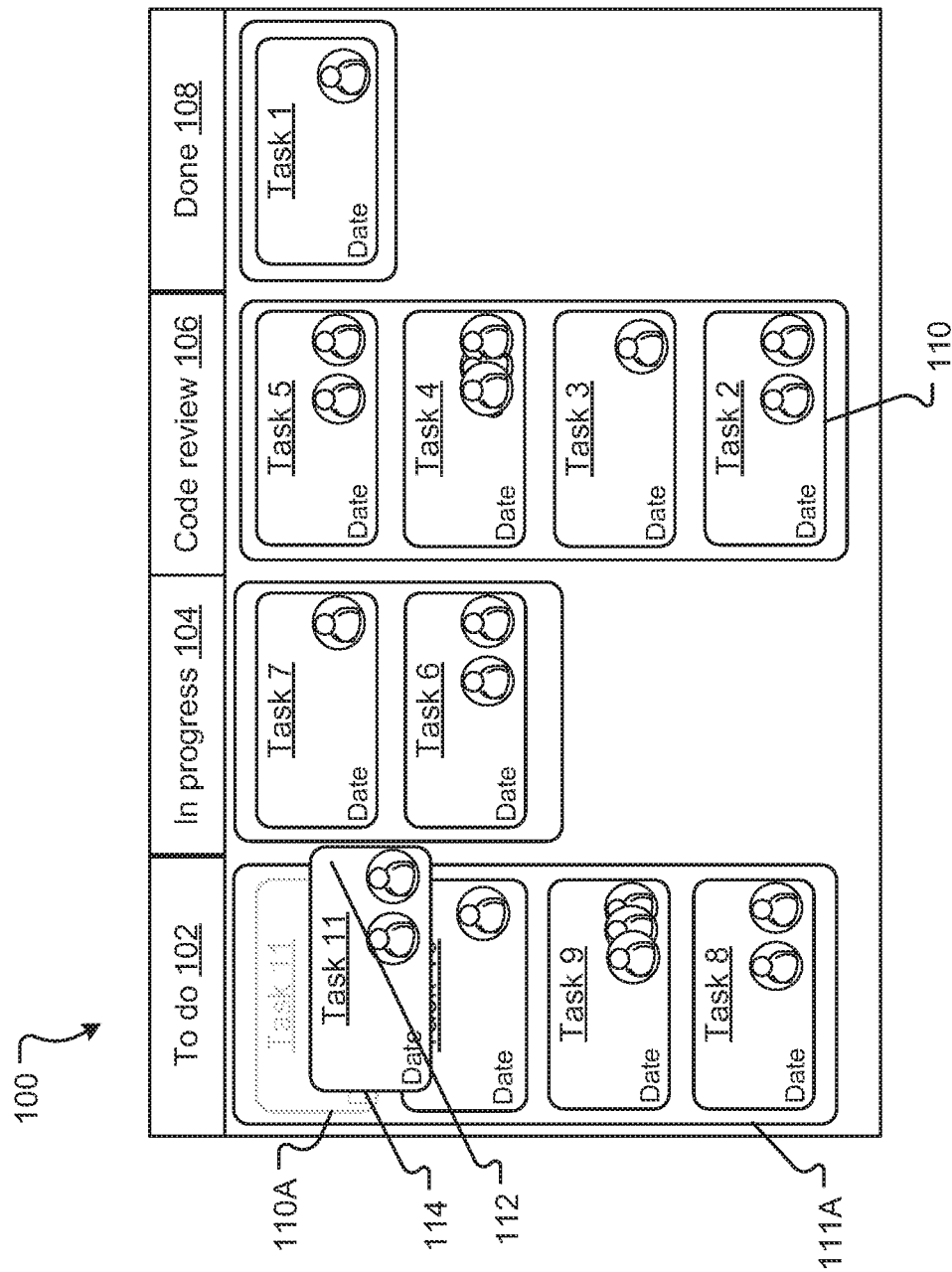
FIG. 1E schematically displays when a cursor during a DND operation is between two droppable areas.

For example, consider the situation during the DND animation shown in FIGS. 1B-1D, where the cursor 112 is no longer in droppable area 111A of the TO DO list 102 and has not yet reached the droppable area 111B of the IN PROGRESS list 104. In this case, neither droppable object is selected or highlighted. This scenario is shown in FIG. 1E. In this case, if the user accidently ends the DND operation at this stage, as no droppable object is selected, the DND operation is voided and the virtual board reverts to its original view (shown in FIG. 1A). Similarly, if the webpage included a plurality of draggable and droppable cards arranged in a row, and a user were to drag a card over the row of droppable cards, the system may select and deselect the droppable cards are the cursor enters a droppable card area, leaves the droppable card area and enters an un-droppable area, and then enters a next droppable card area, and so on.

The constant selection and deselection of the droppable objects in such a DND operation can create a poor user experience. Further, if the user mistakenly ends the DND operation while the cursor is in an in-between un-droppable area, the operation ends and the webpage reverts to its original state.

To address this, aspects of the present disclosure provide a new method and system for increasing the "stickiness" of droppable objects. In particular, once the cursor is detected in a particular droppable object/zone, that particular droppable object/zone is selected as a drop target. When the cursor leaves the droppable object/zone, that particular droppable object/zone continues to be selected as a drop target until the cursor is detected in a next droppable object/zone. When the cursor is detected to be over a next droppable object/zone, the previous droppable object/zone is deselected and the next droppable object/zone becomes the selected drop target. This way, a drop target is selected at all times during a DND operation (after the cursor is determined to be over a first droppable object) and a given droppable object is selected as a drop target until the cursor is detected to be over another droppable object.

Further aspects of the present disclosure maintain a droppable object's "stickiness" while taking into account the hierarchies of droppable objects. In addition, the "stickiness" of objects can be preconfigured. For example, developers can decide for which droppable objects they would wish to maintain stickiness and for which droppable objects they would not wish to do so. Then during a DND operation, if the presently disclosed systems and methods determine that an object is being dragged off a drop target that is sticky, the systems and methods continue to select that object as a drop target. Alternatively, if the droppable object is not sticky, the presently disclosed systems and methods deselect the droppable object as a drop target as soon as the cursor moves away from the droppable object.

These and other aspects of the present disclosure will be described in the following sections.

Example System

Figure 2:
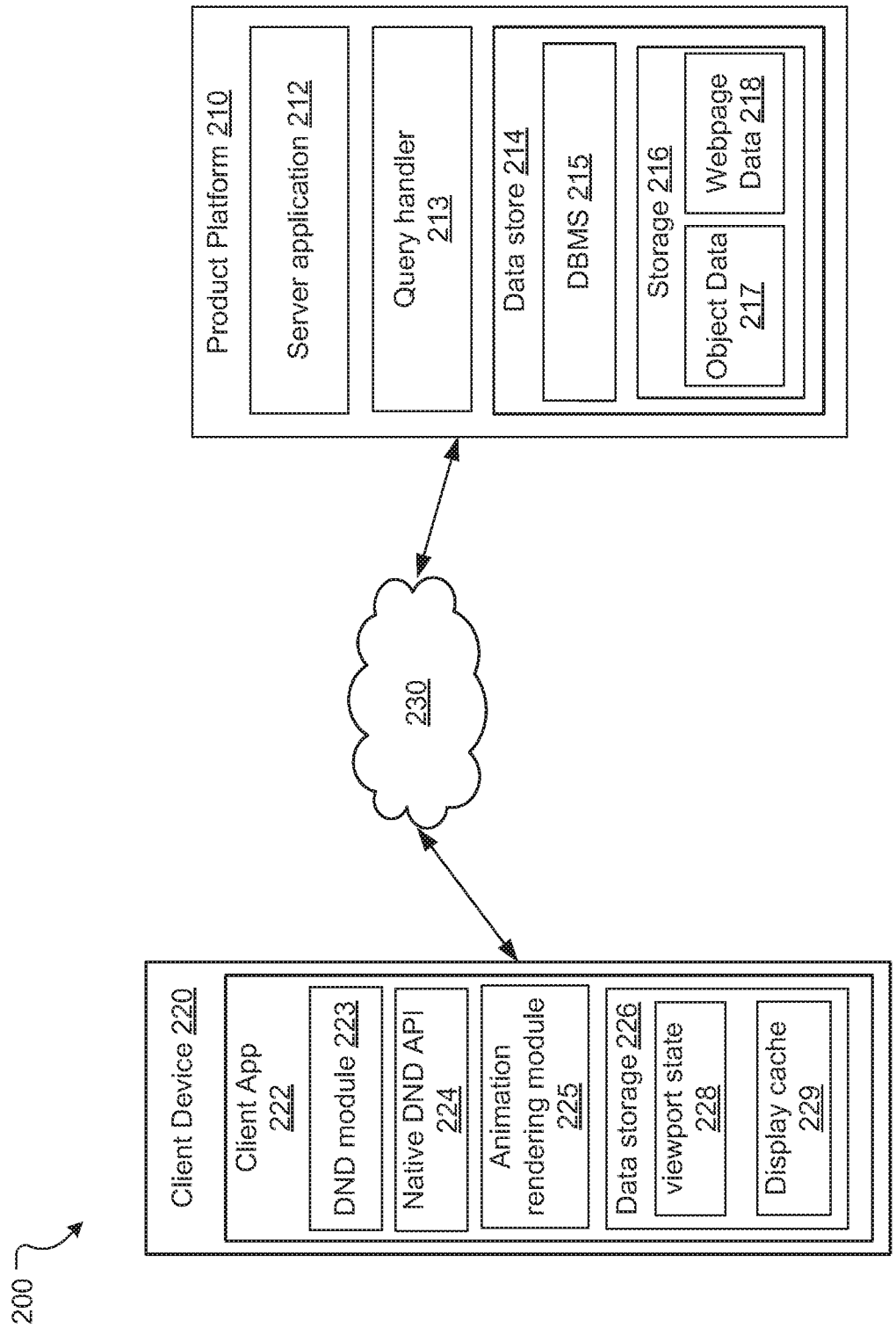
FIG. 2 is a block diagram of a networked environment in which aspects of the present disclosure can be implemented.

FIG. 2 illustrates an example networked environment 200 in which the various operations and techniques described herein can be performed. Specifically, FIG. 2 illustrates the various systems and modules involved in rendering "stickiness" during DND operations. Networked environment 200 includes a product platform 210 and a client device 220, which communicate via one or more communications networks 230.

The product platform 210 may be a system or set of systems configured to provide any type of service/perform any type of operations for clients. In order to provide such services or operations, product platform 210 stores data in a data store 214. As one example, product platform 210 may be an issue tracking system used (inter alia) to create, manage, and track issues. In another example, the product platform 210 may be an object tracking system used to create, manage, and track objects. Product platform 210 may, however, provide other services/perform other operations.

In the present example, product platform 210 includes a server application 212, and a query handler 213.

Server application 212 is executed by a computer processing system to configure that system to provide server-side functionality to one or more corresponding client applications (e.g., client application 222 as discussed below). Further, the server application 212 may be configured to receive data update instructions from the client devices 220 (e.g., based on one or more drag and drop interactions performed by users on displayed web pages such as moving a card from one list to another, adding a file, moving a card vertically in a given list, etc.) and may be configured to perform actions based on these instructions, e.g., it may update the main data store 214 based on the received data update instructions.

Server application 212 comprises one or more application programs, libraries, APIs or other software elements that implement the features and functions that are described herein. For example, where the client application 222 is a web browser, the server application 212 is a web server such as Apache, IIS, nginx, GWS, or an alternative web server. Where the client application 222 is a specific/native application, server application 212 is an application server configured specifically to interact with that client application 222.

In some embodiments, the server application 212 may be provided with both web server and application server applications.

The query handler 213 is configured to receive a web page request from a client device 220 and respond to that web page request with data defining the structure (e.g., styling information), content (e.g., the actual data to be displayed on the web page), and behavior (e.g., interactive components) of the web page. In addition, the query handler 213 is configured to provide a DND component to the requesting client device 220 along with the webpage data. To do this, the query handler 213 is configured to identify the requested web page, requesting client device 220 and in some examples a user identifier of the user making the request, retrieve the web page data for the requested web page, and communicate the structure and content to the client device 220. It also communicates a list of components and libraries associated with the webpage either as part of a HTML head or the HTML body to the requesting client device.

In certain embodiments, product platform 210 is a multi-tenanted system: i.e., server application 212 serves multiple tenants. In these embodiments, any request received by the product platform 210 is associated with a particular tenant— e.g., via a tenant identifier. For example, a given request may be received from/initiated by a particular account, and the identifier for that account will be associated with a tenant identifier.

Data store 214 includes one or more database management systems (DBMS) 215 and one or more data storage systems 216 (operating on one or multiple computer processing systems). Generally speaking, DBMS 215 receives structured query language (SQL) queries from a given application (e.g., server application 212), interacts with data storage system 216 to read/write data as required by those queries, and responds to the relevant application with results of the query.

The storage 216 may store any data relevant to the services provided/operations performed by the server application 212. In the present examples, such data includes object data (i.e., data associated with objects) 217 and webpage data 218. In this context, an object is a logical grouping of data. Data 217 for objects may be stored across multiple database records (e.g., across multiple database tables) that are related to one another by one or more database keys (for example object identifiers and/or other identifiers).

By way of specific example, where product platform 210 is an issue tracking system, the object data 217 may be related to issues that are maintained and managed by the system. In this case, various data can be maintained in respect of a given issue, for example: an issue identifier; an issue state; a team or individual to which the issue has been assigned; an issue description; an issue severity; a service level agreement associated with the issue; a tenant to which the issue relates; an identifier of a creator of the issue; a project to which the issue relates; identifiers of one or more issues that the issue is dependent on; identifiers of one or more issues that depend on the issue; identifiers of one or more other stakeholders; and/or other data.

In another example, where the product platform 210 is an object tracking system, in addition to object data (associated with individual tasks), board data may be stored.

Board data related to virtual boards maintained by the platform 210. This includes, e.g., for each virtual board, a board identifier, a board name, a board description, a creator of a board, number of columns and/or swimlanes in the board, names of columns and/or swimlanes in the board, a list of objects that are part of the board and a list of assignees associated with those objects. As used herein, such board data is referred to as board state data. The board state data may be stored in one or more tables or storage devices as board state records, where each record corresponds to a given board.

As described above, in addition to object data, the storage 216 further stores web page data 218. For instance, for each web page hosted by the product platform 210, the storage 216 may store static webpage data, web page CSS data, and executable components—e.g., JavaScript functions that retrieve dynamic object data from object and/or board databases, execute one or more functions on the webpage, and/or provide interactivity to the webpage data. In addition, the webpage data 218 includes a DND component.

Although the storage 216 is depicted as being part of the main data store 214, the storage 216 may also be maintained as an in-memory cache. Further, one or more of these databases may be maintained as separate entities with their own DBMS.

The applications executed by product platform 210 typically run on multiple computer processing systems. For example, in some implementations each component of the product platform 210 may be executed on a separate computer processing system. In other embodiments, multiple (or even all) components of the product platform 210 may run on a single computer processing system. In certain cases, a clustered server architecture may be used where applications are executed across multiple computing instances (or nodes) that are commissioned/decommissioned on one or more computer processing systems to meet system demand. For example, the server application 212 may be implemented as multiple nodes connected to the network 230 via a load balancer.

The client device 220 may be any computer processing system which is configured (or configurable) by hardware and/or software to offer client-side functionality. By way of example, suitable client devices may include: server computer systems, desktop computers, laptop computers, netbook computers, tablet computing devices, mobile/smart phones, and/or other computer processing systems.

In some embodiments, client device 220 hosts a client application 222 which, when executed by the client device 220, configures the client device 220 to provide client-side functionality of the object tracking system. This may include, for example, interacting with (i.e., sending data to and receiving data from) server application 212 to render web pages, such as virtual boards, by way of which a user interacts with the server application 212. Such interactions typically involve logging on (or otherwise accessing) server application 212 by providing credentials for a valid account maintained by the product platform 210. Once validated, a user can perform various functions using client application 222, for example requesting web pages, performing drag and drop operations on web pages, communicating data to the server application 212 at the end of drag and drop operations, etc.

Client application 222 may be a general web browser application (such as Chrome, Safari, Internet Explorer, Opera, or an alternative web browser application) which accesses a server application such as server application 212 via an appropriate uniform resource locator (URL) and communicates with the server application via general world-wide-web protocols (e.g., HTTP, HTTPS, FTP). When the client application 222 is a web browser, its main function is to present web resources requested by the user. Further, a given client device 220 may have more than one client application 222, for example it may have two or more types of web browsers.

A web browser has seven main components (not shown)—a user interface, a browser engine, a rendering engine, networking module, user interface backend, JavaScript interpreter, and data storage. The user interface allows users to interact with all visual elements available on a webpage and includes parts of the browser display, such as the address bar (where a user can enter a URL of the webpage the user wishes to view), back/forward buttons, etc. The browser engine organizes actions between the UI and the rendering engine and the rendering engine is responsible for displaying the requested content. When a web page is requested, the rendering engine analyses the received HTML and CSS files and renders the analyzed content on the screen. The user interface backend is used to draw or paint basis widgets like combo boxes and windows and the JavaScript Interpreter is used to parse and execute JavaScript code. The data storage is a persistence layer where the browser saves data locally, such as drag and drop libraries, cookies, etc.

In addition to the above, the client application 222 includes one or more native application programming interfaces (APIs) that are built into the browser and provide native features that can be used by web pages loaded by the browser. In the present case, the client application 222 will include a native DND API 224. The native DND API 224 enables web pages or applications to user DND features in the browser. It will be appreciated that a client application 222 typically includes multiple other native APIs, which do not form part of this disclosure and therefore are not described here.

In some embodiments, the native DND API 224 monitors user interaction with a displayed webpage and defines a number of events related to DND operations, which fire when certain user interactions are detected. For example, during a DND operation, the native DND API 224 may fire a "drag" event when it detects that a user has selected a "draggable" item and has commenced moving their input control across the user interface. Similarly, it may fire a "dragend" event when it detects that the user has stopped the dragging action and released the selected draggable item at a location other than a valid drop location on the user interface. A "drageneter" event may be fired when the API detects that during a dragging operation a cursor has entered a valid drop target, and a "dragleave" event may be fired when the API detects that the cursor has left a valid drop target. Further still, the API may fire a "dragstart" event when a user starts dragging a selected "draggable" item, and fire a "drop" event when the selected draggable item is dropped on a valid drop target.

In addition, the client application 222 includes a DND module 223 that is configured to determine drop targets during DND operations based on events fired by the DND API 224. For example, if a drageneter event is fired, the DND module 223 may be configured to identify a valid drop target based on the position of the cursor. Similarly, when a dragleave event is fired, the DND module 223 may be configured to determine whether it should maintain stickiness to the previous drop target or deselect that drop target.

It will be appreciated that the DND module 223 may be received from the product platform 210 along with webpage data for a requested webpage and it may be loaded and executed by the client application 222 while the webpage is displayed. Once the corresponding webpage is closed, the DND module 223 may be flushed from the client application 222 memory. Further, it will be appreciated that although the native DND API 224 may be provided in most cases, it may not always be utilized. In some embodiments, the DND module 223 may be configured to work with other DND programs that fire events. In such cases there may be no need for the native DND API 224.

The client application also includes an animation rendering module 225 that is configured to render animations during drag and drop events based on the events fired by the native DND API 224 and based on communication from the DND module 223. For example, the animation rendering module 225 may be configured to drag a selected object across the webpage, highlight one or more drop targets as the cursor moves over droppable objects, and un-highlight the one or more drop targets as the cursor moves away from those droppable objects. In some cases, depending on input from the DND module 223, the animation rendering module 225 may be configured to continue highlighting droppable objects even after the cursor has move away from the droppable objects. In other cases, it may revert the visual appearance of highlighted droppable objects once the cursor move away from those droppable objects.

The client application 222 also maintains local data on the client device 220, e.g., in a cache. The local data maintained includes web page data 228 and display cache 229. The webpage data essentially stores the data for a web page displayed on the client device 220. It includes web page data including CSS, HTML, and JavaScript components for the given webpage.

Different client devices have different display sizes and possibly have different zoom settings—which affects how much of a web page is displayed on a display of the client device at any given point. Further, the size of the web page itself may vary, such that the entire web page is not visible on a display. To keep track of the web page that is currently visible on the client device 220, the client application 222 maintains a display cache 229 that stores data about the objects (i.e., cards and columns/list) that are displayed on the client device at any given point. In particular, it may store identifiers of objects and their position information. As the user scrolls or otherwise moves the web page, additional portions of the web page may become visible and may be added to this display cache 229 and other portions may disappear from the display and be removed from this display cache 229.

It will be appreciated that the user may have multiple web pages open at any given time (e.g., as different tabs in a web browser). In such cases, each tab of the web browser may be considered an individual client application 222 and the client device 220 may have multiple client applications running at the same. Each client application 222 in this case may maintain its own local cache 228 and display cache 229. While the corresponding web page is displayed, a client application 222 maintains the web page data and display cache. Once the web page is closed, the client application 222 may flush its corresponding web page data 228 and display cache 229.

The product platform 210 and client device 220 communicate data between each other either directly or indirectly through one or more communications networks 230. Communications network 230 may include a local area network (LAN), a public network, or a combination of networks.

It will be appreciated that although FIG. 2 shows a single client device, in reality, multiple client devices can be in communication with the product platform 210 at any given time.

The systems and modules described with respect to FIG. 2 are implemented using one or more computer processing systems.

Figure 3:
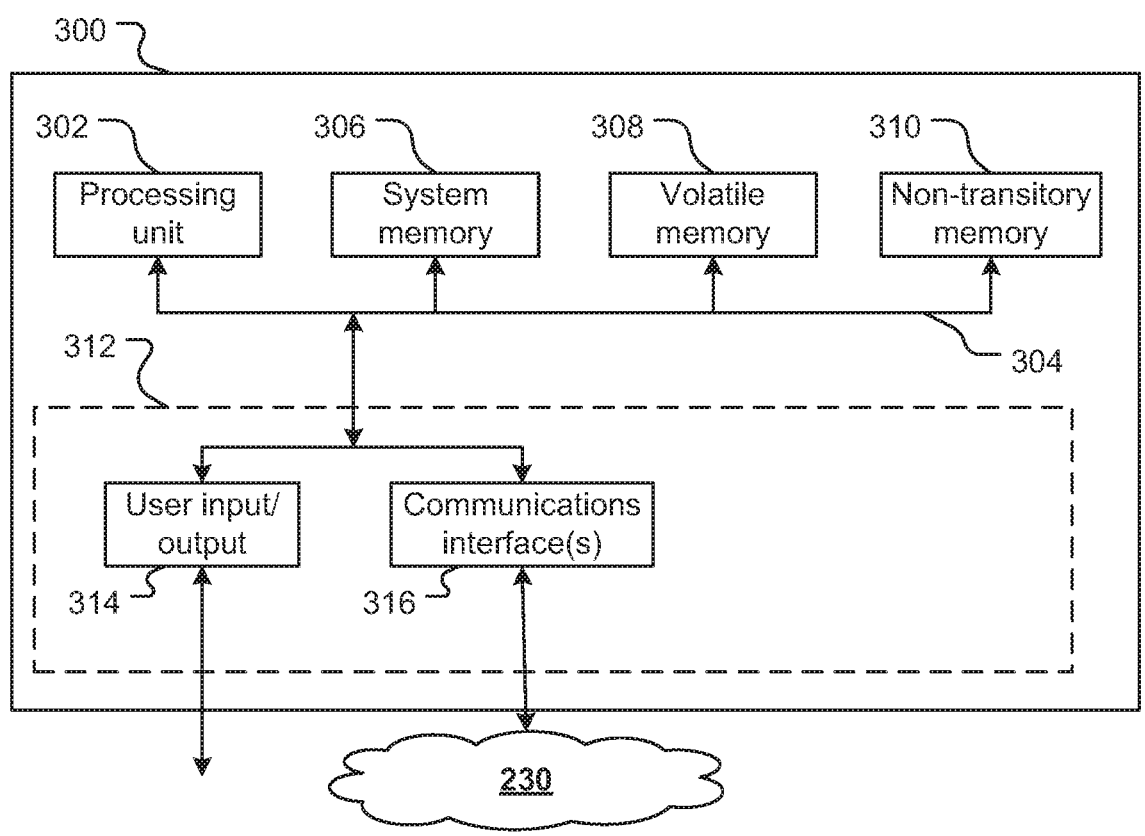
FIG. 3 is a block diagram of a computing system with which various embodiments of the present disclosure may be implemented/configurable to perform various features of the present disclosure.

FIG. 3 provides a block diagram of a computer processing system 300 configurable to implement embodiments and/or features described herein. System 300 is a general purpose computer processing system. It will be appreciated that FIG. 3 does not illustrate all functional or physical components of a computer processing system. For example, no power supply or power supply interface has been depicted, however system 300 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 300 includes at least one processing unit 302—for example a general or central processing unit, a graphics processing unit, or an alternative computational device). Computer processing system 300 may include a plurality of computer processing units. In some instances, where a computer processing system 300 is described as performing an operation or function all processing required to perform that operation or function will be performed by processing unit 302. In other instances, processing required to perform that operation or function may also be performed by remote processing devices accessible to and useable by (either in a shared or dedicated manner) system 300.

Through a communications bus 304, processing unit 302 is in data communication with one or more computer readable storage devices which store instructions and/or data for controlling operation of the processing system 300. In this example, system 300 includes a system memory 306 (e.g., a BIOS), volatile memory 308 (e.g., random access memory such as one or more DRAM applications), and non-volatile (or non-transitory) memory 310 (e.g., one or more hard disks, solid state drives, or other non-transitory computer readable media). Such memory devices may also be referred to as computer readable storage media (or a computer readable medium).

System 300 also includes one or more interfaces, indicated generally by 312, via which system 300 interfaces with various devices and/or networks. Generally speaking, other devices may be integral with system 300, or may be separate. Where a device is separate from system 300, connection between the device and system 300 may be via wired or wireless hardware and communication protocols, and may be a direct or an indirect (e.g., networked) connection.

Wired connection with other devices/networks may be by any appropriate standard or proprietary hardware and connectivity protocols, for example Universal Serial Bus (USB), eSATA, Thunderbolt, Ethernet, HDMI, and/or any other wired connection hardware/connectivity protocol.

Wireless connection with other devices/networks may similarly be by any appropriate standard or proprietary hardware and communications protocols, for example infrared, BlueTooth, Wi-Fi; near field communications (NFC); Global System for Mobile Communications (GSM), Enhanced Data GSM Environment (EDGE), long term evolution (LTE), code division multiple access (CDMA—and/or variants thereof), and/or any other wireless hardware/connectivity protocol.

Generally speaking, and depending on the particular system in question, devices to which system 300 connects—whether by wired or wireless means—include one or more input/output devices (indicated generally by input/output device interface 314). Input devices are used to input data into system 300 for processing by the processing unit 302. Output devices allow data to be output by system 300. Example input/output devices are described below; however, it will be appreciated that not all computer processing systems will include all mentioned devices, and that additional and alternative devices to those mentioned may well be used.

For example, system 300 may include or connect to one or more input devices by which information/data is input into (received by) system 300. Such input devices may include keyboards, mice, trackpads (and/or other touch/contact sensing devices, including touch screen displays), microphones, accelerometers, proximity sensors, GPS devices, touch sensors, and/or other input devices. System 300 may also include or connect to one or more output devices controlled by system 300 to output information. Such output devices may include devices such as displays (e.g., cathode ray tube displays, liquid crystal displays, light emitting diode displays, plasma displays, touch screen displays), speakers, vibration applications, light emitting diodes/other lights, and other output devices. System 300 may also include or connect to devices which may act as both input and output devices, for example memory devices/computer readable media (e.g., hard drives, solid state drives, disk drives, compact flash cards, SD cards, and other memory/computer readable media devices) which system 300 can read data from and/or write data to, and touch screen displays which can both display (output) data and receive touch signals (input).

System 300 also includes one or more communications interfaces 316 for communication with a network, such as network 230 of environment 200. Via a communications interface 316 system 300 can communicate data to and receive data from networked devices, which may themselves be other computer processing systems.

System 300 may be any suitable computer processing system, for example, a server computer system, a desktop computer, a laptop computer, a netbook computer, a tablet computing device, a mobile/smart phone, a personal digital assistant, or an alternative computer processing system.

System 300 stores or has access to computer applications (also referred to as software or programs)—i.e., computer readable instructions and data which, when executed by the processing unit 302, configure system 300 to receive, process, and output data. Instructions and data can be stored on non-transitory computer readable media accessible to system 300. For example, instructions and data may be stored on non-transitory memory 310. Instructions and data may be transmitted to/received by system 300 via a data signal in a transmission channel enabled (for example) by a wired or wireless network connection over interface such as 312.

Applications accessible to system 300 will typically include an operating system application such as Microsoft Windows™, Apple macOS™, Apple iOS™, Android™, Unix™ or Linux™.

System 300 also stores or has access to applications which, when executed by the processing unit 302, configure system 300 to perform various computer-implemented processing operations described herein. For example, and referring to networked environment 200 of FIG. 2 above, client device 220 includes a client application 222 which configures the client device 220 to perform client system operations, and product platform 210 includes server application 212 which configures the server environment computer processing system(s) to perform the described server environment operations.

In some cases, part or all of a given computer-implemented method will be performed by a single computer processing system 300, while in other cases processing may be performed by multiple computer processing systems in data communication with each other.

Example Methods

The following sections describe an example method for animating DND operations according to aspects of the present disclosure.

As described previously, different types of draggable objects may exist in webpages including, cards in lists, connected lists, images, files, icons, etc. If developers wish to make any other objects/elements in their webpages draggable, they are usually required to add a draggable property to the corresponding HTML element with the value of true to its HTML page. For example, if the web page is for a virtual board, developers may declare all cards in the web page to be draggable. Further, different types of droppable objects may exist—i.e., objects onto which other objects may be dropped (e.g., boxes, lists, etc.). Again, any object or element can be made droppable by simply adding a droppable property to the corresponding HTML element with the value of true to its HTML tag. For example, if the web page is for a virtual board, developers may declare all lists to be droppable. In addition, the "droppability" of an object/element—the ability of an object to be considered a valid drop target—may be conditional. For instance, a list may be a valid drop target for any cards. However, a list may not be a valid drop target for other lists (unless combine operations are allowed) or for other entity types, such as files or images. The conditional droppability of objects can also be added as a property to the element in the webpage code. Finally, objects in a webpage can have hierarchies. For examples, in a virtual board, a list may be considered a parent object and any cards within the list may be considered children objects. And developers may define different droppability or draggability properties for these parent and children objects. For example, in some cases, parent objects and their children objects may be droppable or draggable. In other cases, children objects may only be draggable but parent objects may be draggable and droppable.

According to aspects of the present disclosure, in addition to adding draggability and droppability properties to objects, developers can also add a "stickiness" property to droppable objects. In particular, developers can decide whether a droppable object should remain selected once the cursor 112 is no longer over the droppable object (sticky) or whether the object should be deselected once the cursor 112 is no longer over the droppable object (not sticky). To this end, developers may add the stickiness property to the corresponding HTML element with the value of true for sticky and a value of false for not sticky.

Figure 4:
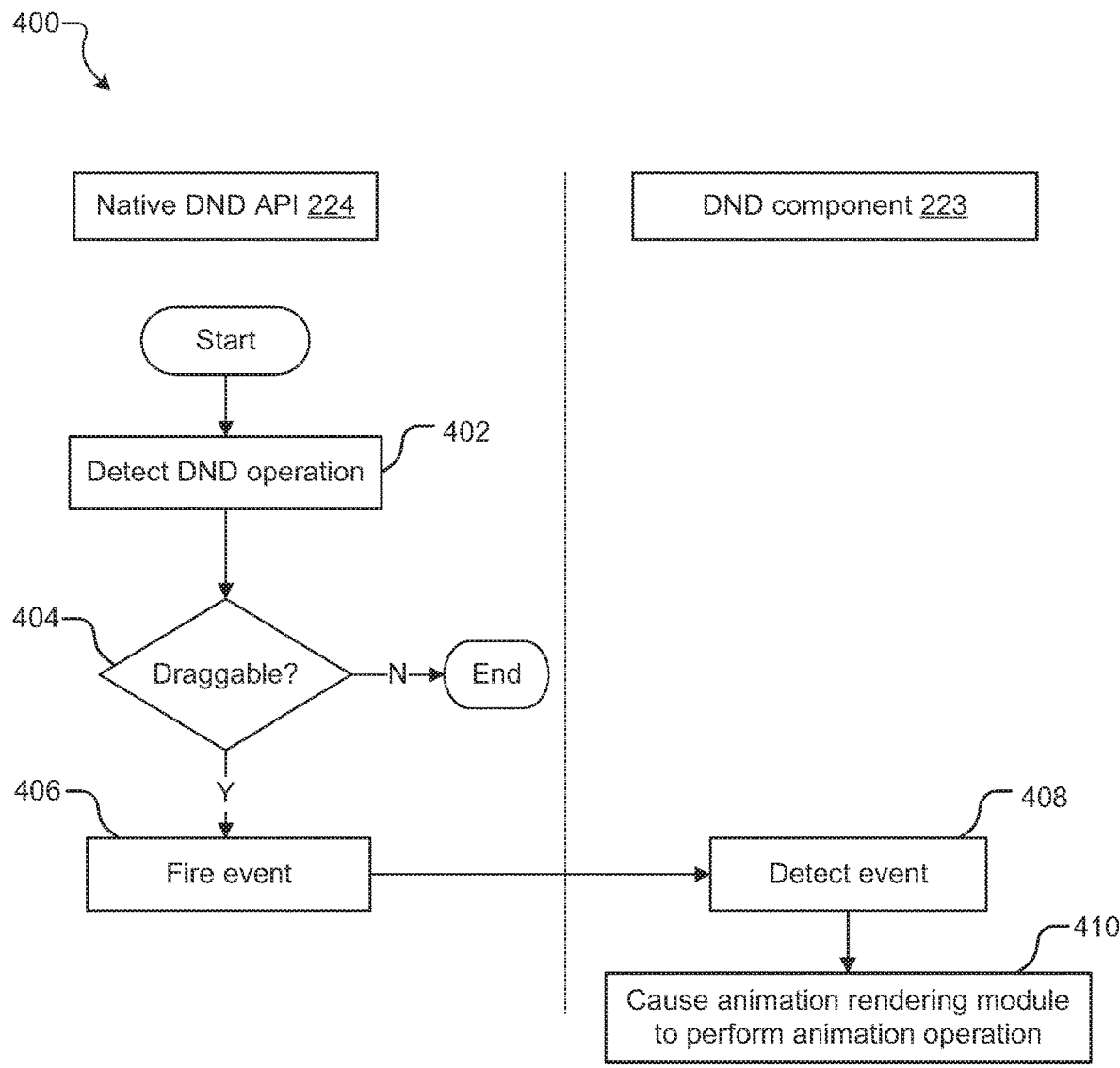
FIG. 4 is a flowchart illustrating an example method for animating a DND operation according to aspects of the present disclosure.

FIG. 4 illustrates an example method 400 for animating a DND operation according to aspects of the present disclosure. It will be appreciated that method 400 is described in reference to virtual boards and in particular in reference to virtual board 100 shown in FIG. 1A. It will be appreciated that this is merely done for the sake of clarity and ease of description. The presently disclosed DND animation rendering methods are by no means restricted to rendering such animations in virtual boards. Instead, they may be utilized to animate DND operations for any other types of webpages that include draggable and droppable objects without departing from the scope of the present disclosure.

Prior to commencement of method 400, a webpage with draggable and droppable objects may be displayed on the display of a client device. In order to do so, the client application 222 may initially communicate a request for a webpage, e.g., virtual board 100 of FIG. 1A, to the query handler 213 of the product platform 210. This may involve a user entering a web page URL in a search bar of the web browser or selecting a particular web page from a list of search results. In other cases, the browser may automatically generate and send the web page request, for example, when a user logs into an application hosted by the product platform 210 via a login page. In any event, the web page request includes a URL or any other identifier of the web page. For instance, the web page request may be a request as follows to retrieve a virtual board (e.g., board 100) from an object tracking application—

HTTP GET
www.jira.com/boardview

In addition to the URL, the web page request may include some information about the client application 222 making the request (e.g., a client application identifier). If the user is logged into the application, the web page request may also include a user identifier of the user and in some cases the tenant identifier of the corresponding tenant (for example, if the product application is a multi-tenanted application).

In response to sending the webpage request, the client application 222 receives the requested webpage data from the query handler 213. To do so, the query handler 213 receives the web page request, retrieves the requested web content from the data store 214, and communicates it to the client application 222. In some examples, the query handler 213 may store web page data 218 in a cache for quick retrieval. In other cases, web page data 218 may be retrieved from storage 216 by querying the DBMS 215.

Once the client application 222 receives the webpage data, it renders the webpage on the display of the client device 220. In addition, along with the webpage data, the client application 222 receives the DND component from the product platform 210 and loads this as DND module 223 on the client device 220.

Method 400 commences at step 402, where the native DND API 224 of the client application 222 detects a DND operation. For example, the DND API 224 may detect that a user has selected an object (e.g., card 110) on the displayed virtual board 100 using a suitable input control means and is attempting to drag that object. It may then determine whether the selected object is draggable (e.g., by inspecting the properties of the object in the HTML code) at step 404. If the DND API 224 determines that the object is not draggable (e.g., because the object's properties do not list that the object is draggable), the DND API 224 does not fire any events and the method 400 ends.

Alternatively, if the DND API 224 determines that the object is draggable, it fires one or more events at step 406 and continues to fire the one or more events until it determines that the DND operation has ended. The events may include the identifier of the object that is detected to be selected by the user.

At step 408, the DND module 223 listens for and detects the one or more events fired by the DND API 224.

At step 410, the DND module 223 causes the animation rendering module 225 to perform one or more animation operations in response to the detected event(s). For example, if the event is a "dragstart" event that indicates that a user has started dragging an item, the DND module 223 may cause the animation rendering module 225 to create a ghost image (e.g., image 114) of the selected object and attach the ghost image 114 to the cursor 112. In other examples, the animation rendering module 225 may remove the original selected object (e.g., card 110) from its origin location and attach the object to the cursor 112. In this case, the animation rendering module 225 may also cause the client application 222 to display a placeholder (having the shape and size of the selected card 110) in the original location so that the user knows the position of the object in its original location in case the user wishes to revert the drag and drop operation.

Alternatively, if the event is a "drag" event that indicates that a draggable item is being dragged across the webpage, the DND module 223 may cause the animation rendering module 225 to continue moving the object (e.g., the ghost image 114 or card 110) across the webpage as the cursor 112 moves, as described above.

In case the event is a "dragend" event that indicates that the drag operation has ended, e.g., because the user has released a mouse button or hit an ESC key, the DND module 223 detects this "dragend" event and causes the animation rendering module 225 to perform a corresponding animation method. For example, the animation rendering module 225 may revert the virtual board's state to that before the DND operation started and method 400 may end.

If the event is a "drop" event indicating that the item has been dropped on a valid drop target, the DND module 223 may cause the animation rendering module 225 to execute an operation that causes the graphical user interface (e.g., the virtual board 100) to change, such that the draggable object (e.g., card 110) is rendered in the valid drop target (e.g., IN PROGRESS list 104) and removed from the original location (e.g., TO DO list 102). This is shown in example FIG. 1D.

Figure 5:
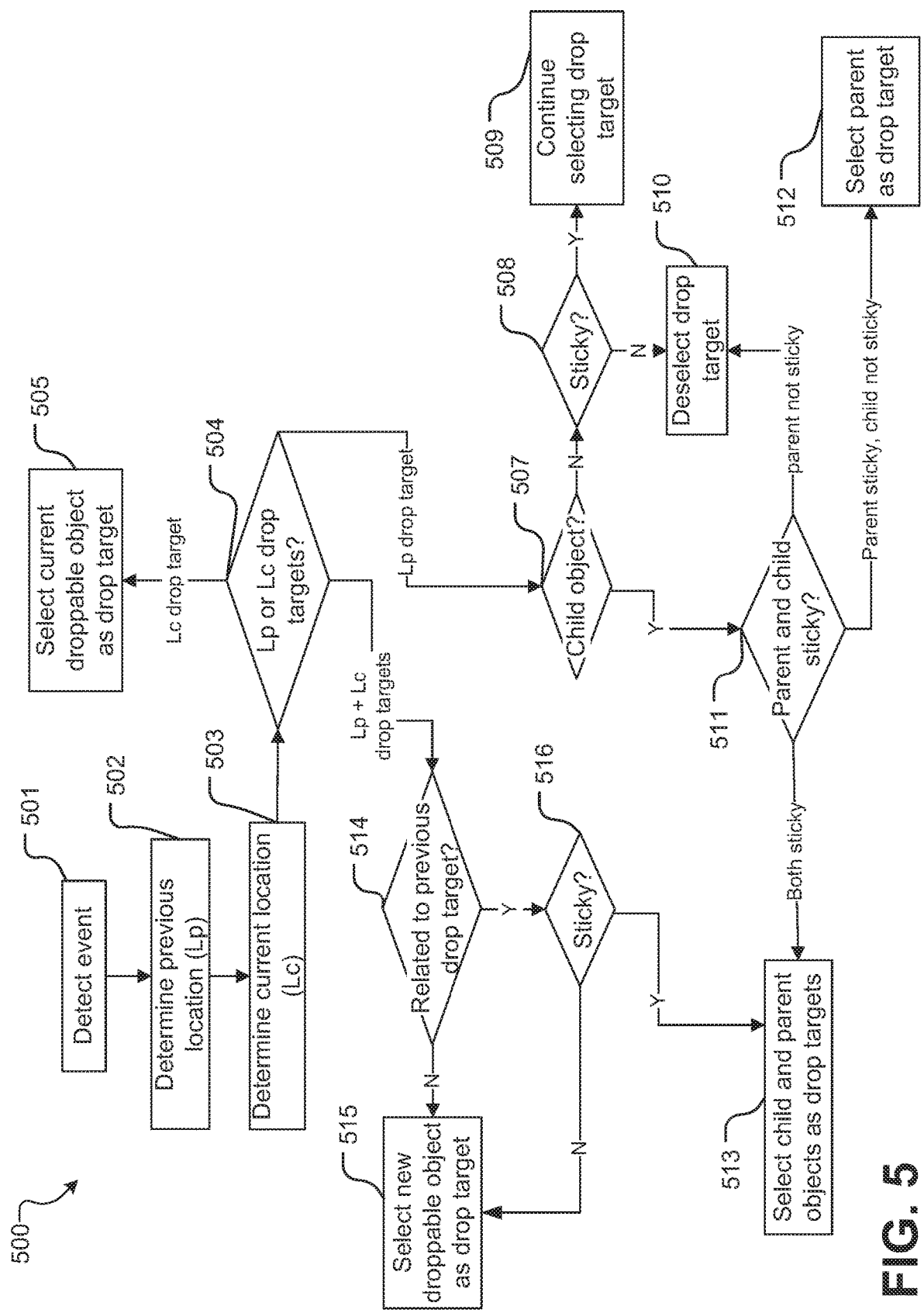
FIG. 5 is a flowchart illustrating an example method for determining a current drop target during a drag and drop operation according to aspects of the present disclosure.

Alternatively, if the event is a "drag enter" event or a "drag over" event, the DND module 223 performs a method as described with reference to FIG. 5.

Method 500 commences at step 501, where the DND module 223 detects a change. For instance, the DND module 223 may detect a drag enter event fired by the DND API 224 that indicates that the cursor 112 has entered a droppable object or a drag over event fired by the DND API 224 that indicates that the cursor is over a droppable object. In some cases, the DND module 223 may simply detect a change—e.g., the cursor may not move, but an object (such as a card) may be deleted while the cursor was on the card. The DND module 223 may detect this change in the relative position of the cursor 112 as it is no longer over the droppable object it was previously over. Similarly, the droppability of an object may change while a cursor is over an object. In this case, the cursor may not have moved, but the property of an object under the cursor has changed to droppable.

At step 502, the DND module 223 determines the location of the cursor before the detected event. That is, it determines whether the cursor was over a valid drop target before the detected event. For example, consider the virtual board depicted in FIG. 1E. In this example, as the cursor 112 moves into the area between the two droppable lists, the DND API 224 may generate a "drag enter" event. In response to detecting this event, the DND module 223 determines the previous location of the cursor 112, and in particular, determines whether the cursor was previously over a valid drop target or not. In the example depicted in FIG. 1, it determines at step 502 and the cursor was over droppable list 102. It then determines whether this droppable object was a valid drop target, e.g., by inspecting the properties of the droppable object to determine whether it has any drop conditions and whether the draggable object meets the drop conditions of the droppable object (if any).

If the droppable object has no condition or the conditions are met by the draggable object, the DND module 223 determines that the previous location of the draggable object was a valid drop target. Otherwise, it determines that the previous location of the draggable object was not a valid drop target.

At step 503, the DND module 223 determines whether the cursor is currently over a valid drop target. For example, consider the virtual board depicted in FIG. 1C. In this example, as the cursor 112 moves into the droppable list 104, at step 503, the DND module 223 may determine whether the droppable object, e.g., droppable list 104, is a valid drop target for the draggable object (e.g., card 110). In this case, the DND module 223 may determine whether there are any conditions associated with the droppable list 104. If there are any conditions, it determines whether those conditions are satisfied by the draggable object that is currently over the droppable object—e.g., whether the draggable object is of the type that the droppable object can accept. If the DND module 223 determines that the draggable object meets the condition of the droppable object, it selects the droppable object as a valid drop target. Alternatively, if the DND module 223 determines that the draggable object does not meet the condition of the droppable object—e.g., because the draggable object is not of a type that the droppable object can accept, it does not select the droppable object as a valid drop target.

Once the previous and actual/current locations are determined, the DND module 223 generates an output based on whether the previous and/or current locations are valid drop targets and depending on the stickiness properties of the drop targets in the previous location.

For example, at step 504, the DND module 223 determines whether any of the previous and current locations of the cursor were associated with drop targets. If neither the cursor location before the event nor the cursor location after the event was over a valid drop target, the DND module 223 causes the animation rendering module 225 to continue moving the draggable object (e.g., the ghost image 114 or card 110) across the webpage as the cursor 112 moves without making any changes to the droppable object associated with the drag enter or drag over event.

If the DND module 223 determines that the current location of the cursor is over a valid drop target but the cursor was not previously over a valid drop target, the method proceeds to step 505 where the DND module 223 selects the current droppable object as a valid drop target and causes the animation rendering module 225 to highlight the current droppable object.

Alternatively, if the previous cursor location was over a valid drop target and the current cursor location is not over a valid drop target (e.g., the cursor has moved out of a valid drop target and is no longer over a valid drop target, but over non-man's land). In this case, if the animation rendering module 225 determines that the previous location of the cursor 112 was over a valid drop target and the current location of the cursor is not over a valid drop target, the method proceeds to step 507 where the DND module 223 determines whether the valid drop target associated with the previous location is a child object, e.g., whether the valid drop target associated with the previous location is nested in another droppable object (e.g., by inspecting the drop target properties).

If the DND module 223 determines that the drop target associated with the previous location is not a child object associated with a parent object, but an independent droppable object that is not nested within another droppable object, the DND module 223 determines whether the valid drop object is sticky at step 508. To this end, the DND module 223 may review the object properties and check the status of the sticky property of the droppable object (true and sticky or false and not sticky).

If the DND module 223 determines that the previous drop target is sticky, the method proceeds to step 509 where the DND module 223 continues to select the previous drop target as a drop target and causes the animation rendering module 225 to continue highlighting that droppable object on the graphical user interface so that the user knows that if they complete the drop operation at this stage, the object will drop on the highlighted object.

Figure 6A:
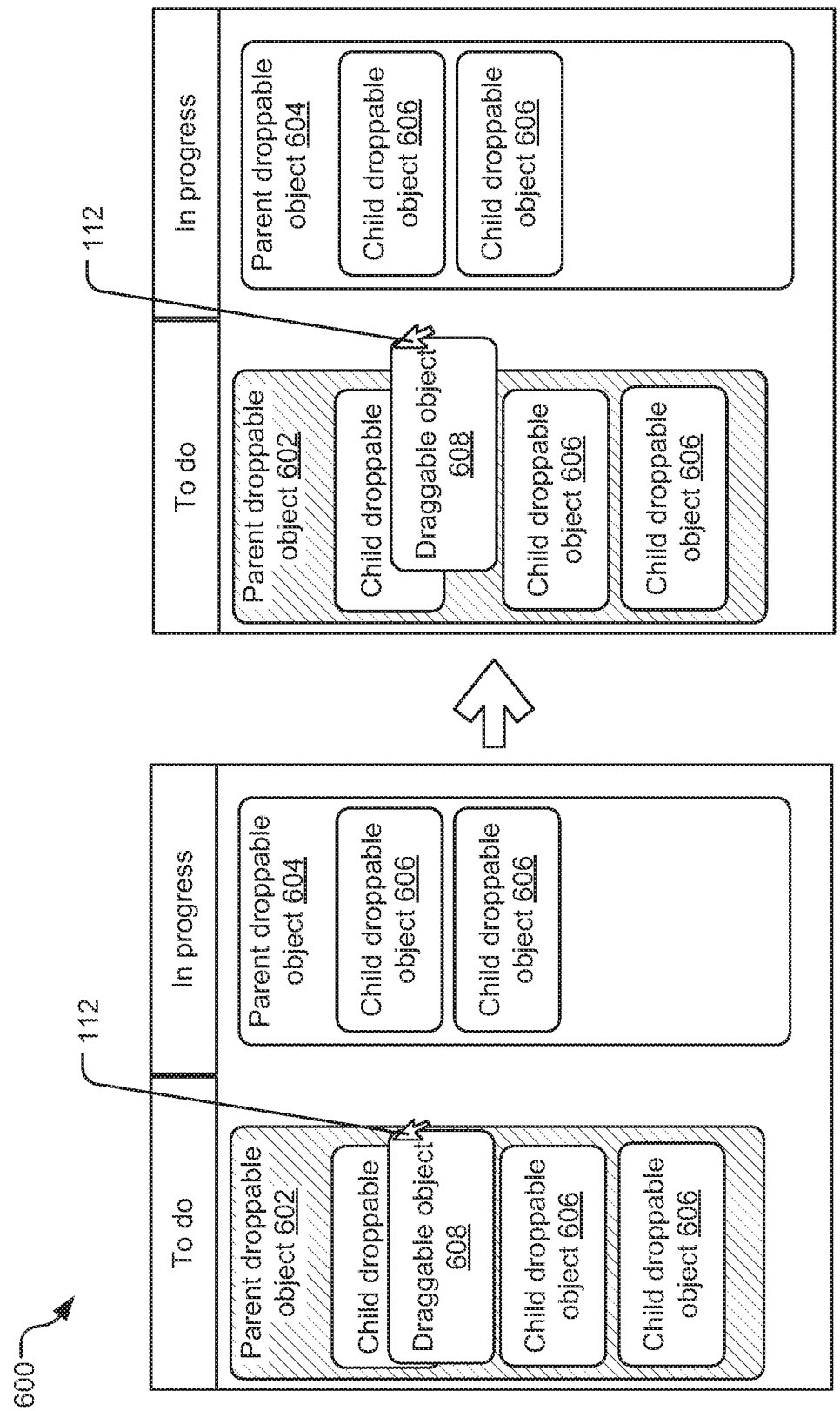
FIG. 6A depicts a virtual board at two instances of time when a cursor moves from a sticky drop target according to some aspects of the present disclosure.

This is depicted in FIG. 6A that shows a virtual board 600 at two instances of time. The virtual board 600 including two lists—TO DO and IN PROGRESS. Each list includes a parent droppable object —602 and 604 associated with the whole list and children droppable objects 606 (represented as cards in the lists in this example). In this example, in the first instance of time, the cursor 112 is over the parent droppable object 602 and this object is selected as the valid drop target and highlighted as shown in FIG. 6A. In the second instance, the cursor 112 has left the parent droppable object 602 and is currently not over any droppable objects (but in no-man's land between the two lists 602, 604). In this case, as the parent droppable object 602 is declared as sticky, the parent droppable object 602 remains selected as a valid drop zone and therefore remains highlighted in the virtual board 600.

Alternatively, if at step 508, the DND module 223 determines that the droppable object is not sticky, the method proceeds to step 510 where the DND module 223 deselects the previous valid drop target and causes the animation rendering module 225 to update the GUI so that the droppable object is no longer highlighted or in any other way visually demarcated from other non-selected droppable objects.

Figure 6B:
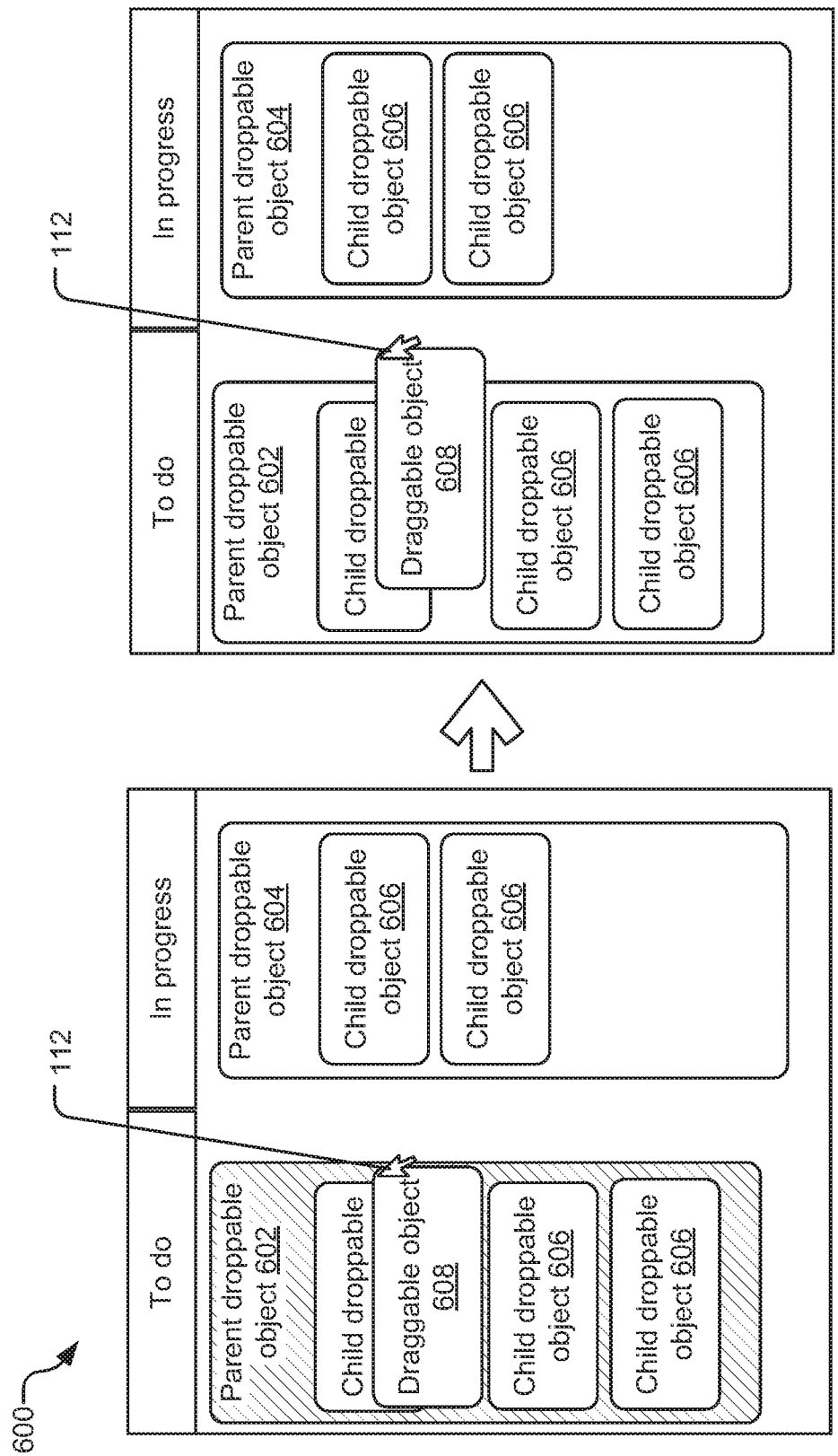
FIG. 6B depicts a virtual board at two instances of time when a cursor moves from a non-sticky drop target according to aspects of the present disclosure.

This is depicted in FIG. 6B. In this example, in the first instance of time, the cursor 112 is over the parent droppable object 602 and this object is selected as the valid drop target and highlighted. In the second instances of time, the cursor 112 has moved outside this droppable object 602. In this case, as the parent droppable object 602 is not sticky, the parent droppable object 602 is deselected and un-highlighted.

Returning to step 507, if at this step the DND module 223 determines that the previous drop target is a child object nested within a parent droppable object, the method 500 proceeds to step 511, where the DND module 223 determines whether the parent and child droppable objects associated with the previous valid drop target are sticky.

If the DND module 223 determines that neither the child nor the parent droppable object is sticky, the method proceeds to step 510 where the DND module 223 deselects the previous valid drop target and causes the animation rendering module 225 to update the GUI so that the droppable object is no longer highlighted or in any other way visually demarcated from other non-selected droppable objects.

Similarly, if the DND module 223 determines that the child droppable object is sticky but the parent droppable object is not sticky, the method proceeds to step 510 where the DND module 223 deselects the previous valid drop target and causes the animation rendering module 225 to update the GUI so that the droppable object is no longer highlighted or in any other way visually demarcated from other non-selected droppable objects.

Figure 6C:
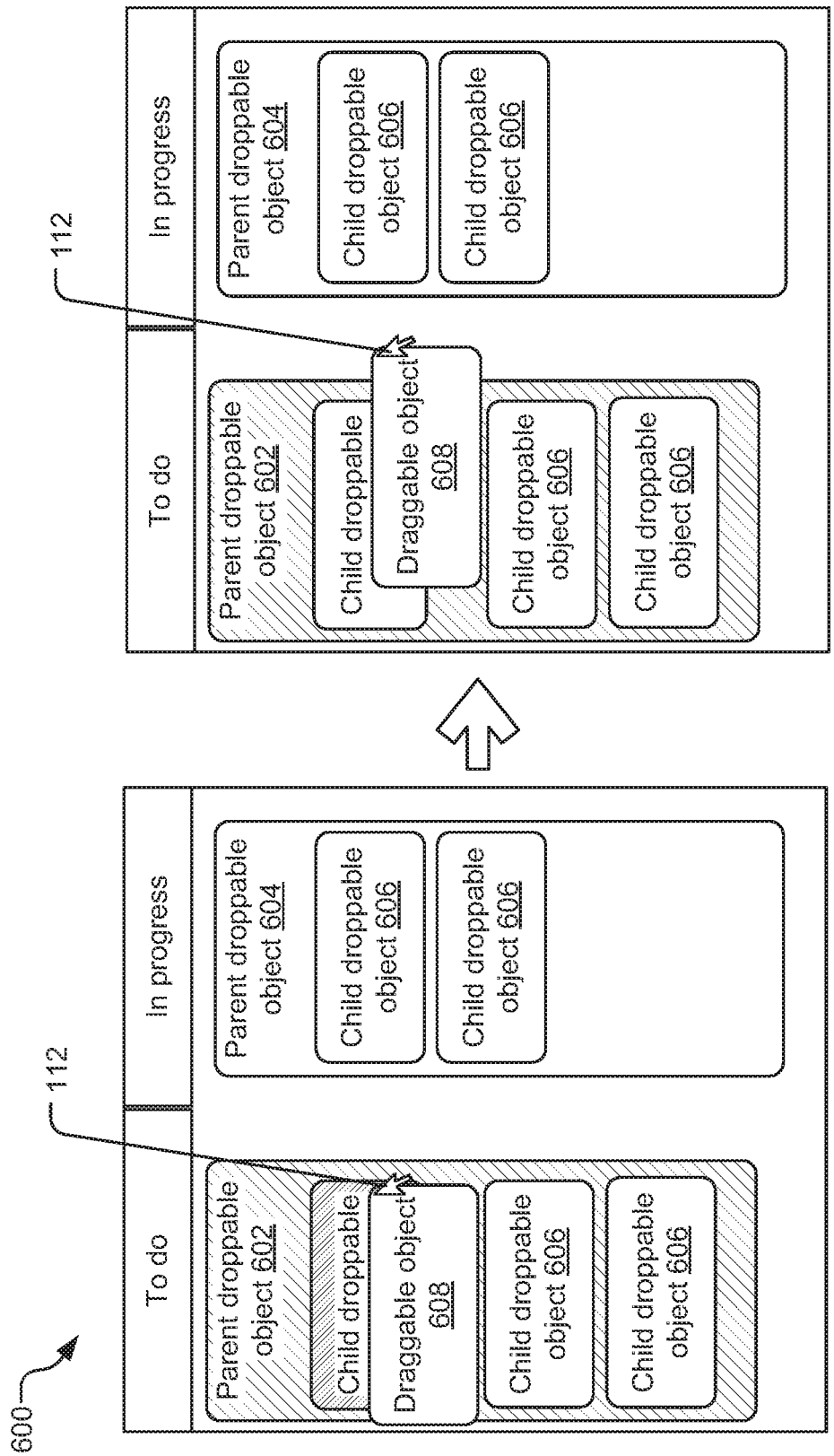
FIG. 6C depicts a virtual board at two instances of time when a cursor moves from a child non-sticky drop target according to aspects of the present disclosure.
Figure 6D:
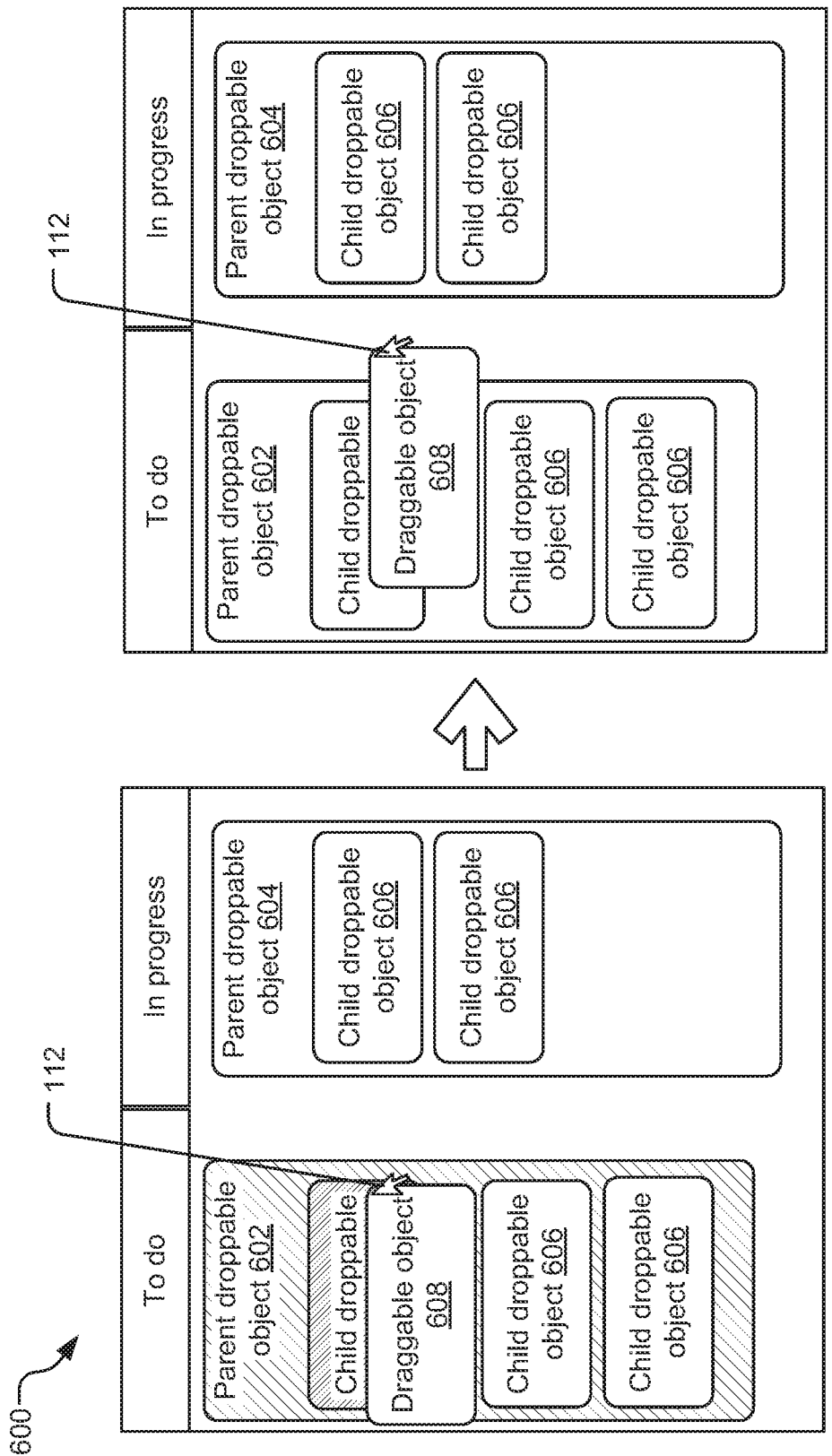
FIG. 6D depicts a virtual board at two instances of time when a cursor moves from a child non-sticky drop target that has a non-sticky parent droppable object according to aspects of the present disclosure.

This is depicted in FIG. 6D which shows the virtual board 600 at two different instances of time. In this example, in the first instance of time, the cursor 112 is over the child droppable object 606 and this object and its parent object is selected as the valid drop target and highlighted. In the second instance of time, the cursor 112 has moved outside the droppable object 602. In this case, as the child is sticky but its parent droppable object 602 is not sticky, both the child and parent droppable objects 606, 602 are deselected and un-highlighted.

Alternatively, if the child node is not sticky, but the parent node is sticky, the method proceeds to step 512 where the DND module 223 selects the parent object as the drop target and deselects the child object as a drop target. Further, it causes the animation rendering module 225 to update the GUI such that the parent droppable object is highlighted and the child droppable object is no longer selected.

This is depicted by the example virtual board 600 in FIG. 6C at two different instances of time. In this example, in the first instance of time, the cursor 112 is over the child droppable object 606 and this object and its parent object is selected as the valid drop target and highlighted. In the second instance of time, the cursor 112 has moved outside the child droppable object 606 and the parent droppable object 602. In this case, as the child droppable object 606 is not sticky and the parent droppable object 602 is sticky, the parent droppable object 602 remains selected and highlighted whereas the child droppable object 606 is deselected and un-highlighted.

Returning to step 511, if at this step, the DND module 223 determines that both the child and parent object associated with the previous drop target are sticky, the method proceeds to step 513 where both the child and parent droppable objects remain selected as drop targets, and both the parent and child droppable objects remain highlighted.

Figure 6E:
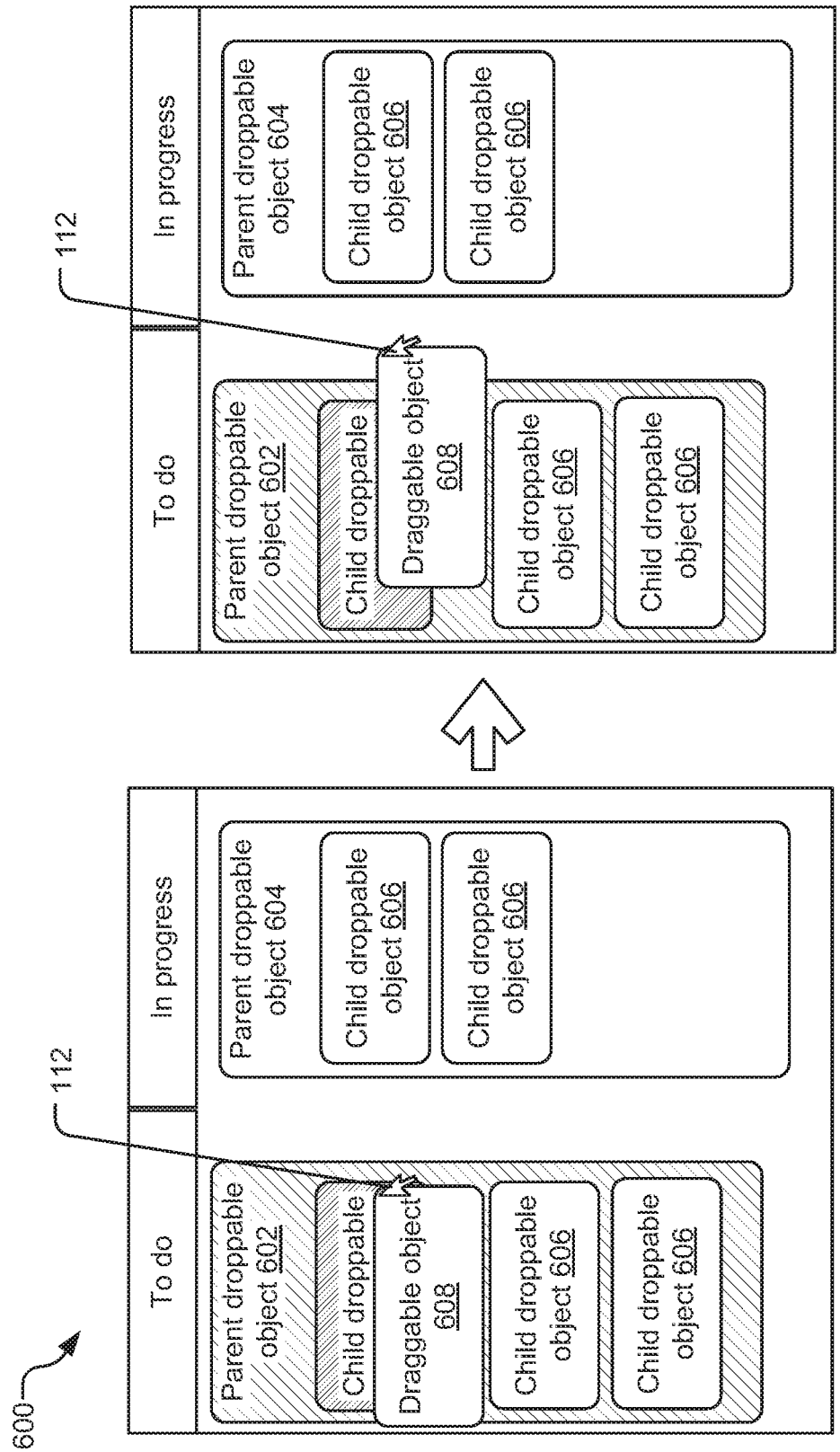
FIG. 6E depicts a virtual board at two instances of time when a cursor moves from a child sticky drop target that has a sticky parent droppable object according to aspects of the present disclosure.

This is depicted in FIG. 6E which shows the virtual board 600 at two different instances of time. In this example, in the first instance of time, the cursor 112 is over the child droppable object 606 and this object and its parent object is selected as the valid drop target and highlighted. In the second instance of time, the cursor 112 has moved outside the droppable object 602. In this case, as both the child droppable object 606 and the parent droppable object 602 are sticky, both the child and parent droppable objects 606, 602 remain selected and highlighted.

Returning to step 504, if at this step it is determined that the cursor was previously over a valid drop target and it is currently also over a valid drop target (e.g., if the cursor has moved out of one drop target and into another), the method proceeds to step 514, where the DND module 223 determines whether the current valid drop target is related to the previous valid drop target. For example, a determination may be made whether the current drop target is the parent or child of the previous drop target. This determination may be made by inspecting the properties of the new drop target and/or the previous drop target.

If DND module 223 determines that the new drop target is not related to the previous drop target by a parent-child relationship, the method proceeds to step 515, where the new drop target is selected as a valid drop target and the graphical user interface is updated to highlight the new droppable object and un-highlights the previous droppable object.

Figure 6F:
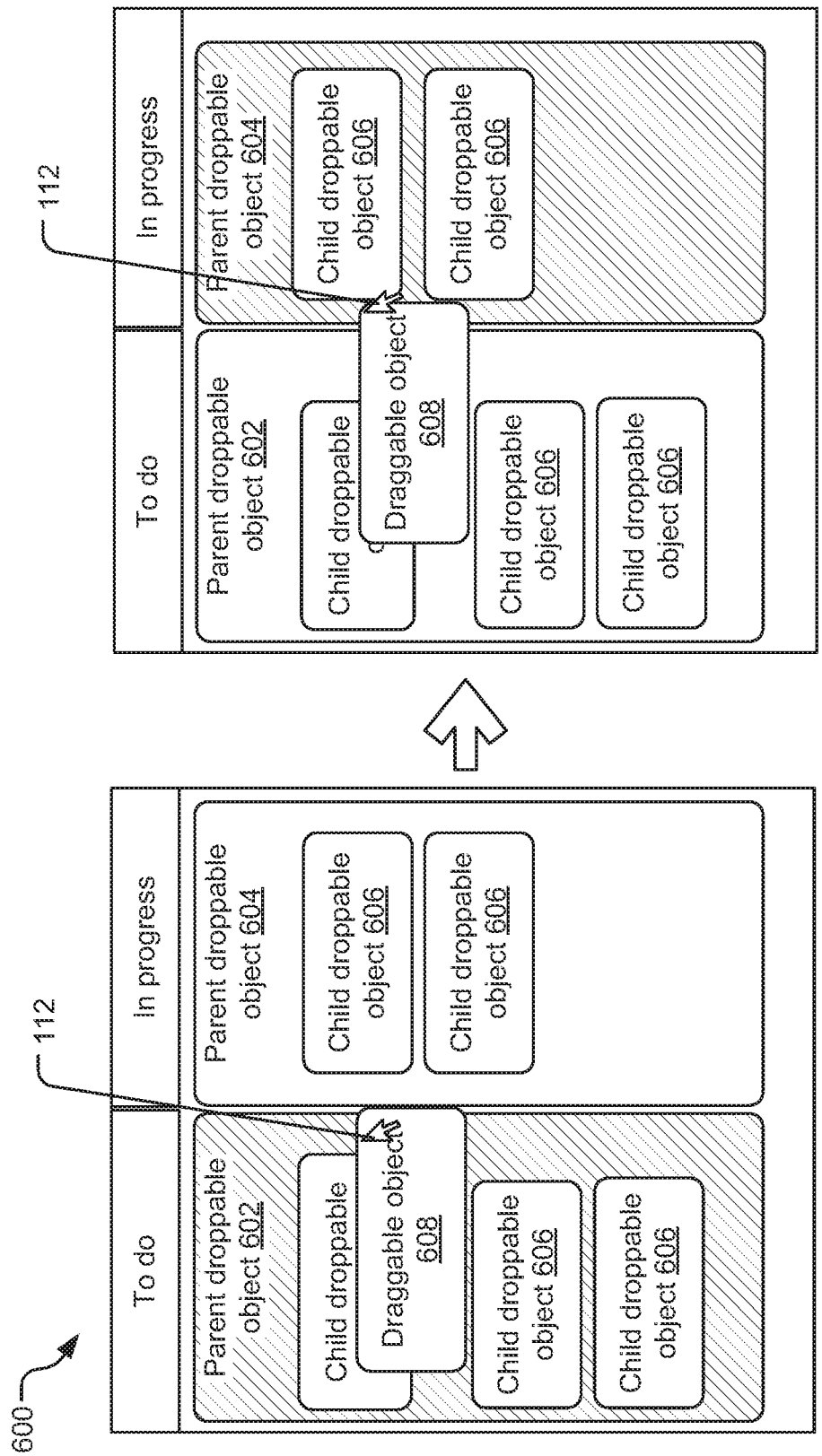
FIG. 6F depicts a virtual board at two instances of time when a cursor moves from a first drop target to a second drop target that is not related to the first drop target according to aspects of the present disclosure.

This is depicted in FIG. 6F which shows the virtual board 600 at two different instances of time. In this example, in the first instance of time, the cursor 112 is over the parent droppable object 602 and this object is selected as the valid drop target and highlighted. In the second instance of time, the cursor 112 has moved to the parent droppable object 604. In this case, as the parent droppable object 604 is not related to the parent droppable object 602, parent droppable object 604 is selected as the valid drop target and highlighted in the virtual board while parent droppable object 602 is unhighlighted.

Alternatively, if at step 514, the DND module 223 determines that the current drop target is related to the previous drop target, e.g., by a parent-child relationship, the method proceeds to step 516, where the DND module 223 determines whether the previous drop target is sticky. This is similar to steps 508 and not described here again.

If it is determined that the previous drop target is sticky, the method proceeds to step 513 where both the current and previous droppable objects are selected as valid drop targets and highlighted.

Figure 6G:
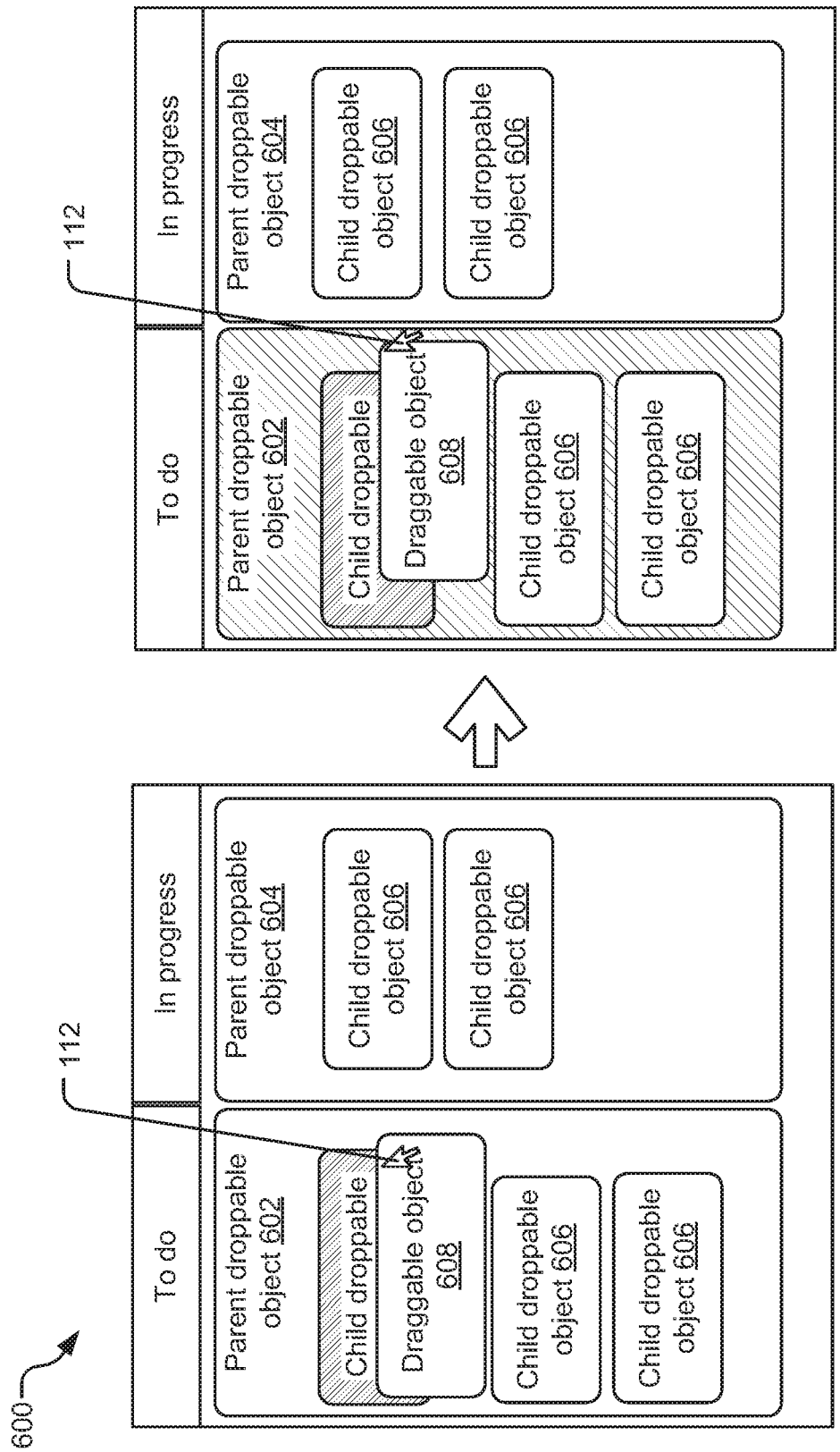
FIG. 6G depicts a virtual board at two instances of time when a cursor moves from a first drop target to a second drop target that is related to the first drop target according to aspects of the present disclosure.

This is depicted in FIG. 6G, which shows the virtual board 600 at two different instances of time. In this example, in the first instance of time (represented by the virtual board 605), the cursor 112 is over the child droppable object 606 and this object is selected as the valid drop target and highlighted. In the second instance of time, the cursor 112 has moved to the parent droppable object 602. In this case, as the parent droppable object 604 is related to the child droppable object 606 and the child droppable object is declared as a sticky object, both the child droppable object and the parent droppable objects 602 are selected as valid drop targets and the child droppable object remains highlighted and the parent droppable object 602 is also highlighted.

Alternatively, if the previous valid drop target is not sticky, the method proceeds to step 515, where the new drop target is selected as the valid drop target.

Accordingly, depending on the stickiness of droppable objects, the position of the cursor and the relationships between objects, the presently disclosed object rendering module may determine how to animate the condition when a cursor leaves a droppable object selected as a valid drop target.

It will be appreciated that in method 500, it is presumed that the current and previous locations of the cursor are over different objects. However, this need not be the case. In some examples, if the previous and current cursor locations are over the same droppable object (e.g., in the case of a drag over event), the method 500 ends.

Although aspects of the present disclosure are described with reference to an object tracking application, it will be appreciated that this need not be the case. Aspects of the present application can be implemented in user interfaces associated with other types of software applications. For example, aspects of the present disclosure can be used in user interfaces associated with software applications that display interactive data in the form of tables, grids, or lists with interactive or movable objects (such as cells, rows, columns, values) within the tables, grids, or lists.

The flowcharts illustrated in the figures and described above define operations in particular orders to explain various features. In some cases, the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

Although the present disclosure uses terms "first," "second," etc. to describe various elements, these terms are used only to distinguish elements from one another and not in an ordinal sense.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage, or attribute that is not expressly recited in a claim should be considered as a required or essential feature. Accordingly, the specification and drawings are to be regarded in an illustrative rather than a restrictive sense.

What is claimed is:

1. A method for determining a current drop target during a drag and drop operation, the method comprising:
    causing display of a virtual board, the virtual board comprising a plurality of workflow state columns and a plurality of draggable issue items located within a workflow state column of the plurality of workflow state columns;
    in response to a user selection of a particular draggable issue item, initiate the drag and drop operation;
    determining that a previous location of the draggable item was at least partially over a first workflow state column of the plurality of workflow state columns prior to the initiation of the drag and drop operation;
    determining that a current location of the draggable item is at least partially over a second workflow state column of the plurality of workflow state columns; and
    obtaining a first stickiness parameter of the first workflow state column, the first stickiness parameter indicating whether the first workflow state column is selected or deselected as a current drop target for dropping the draggable issue item based at least in part on the current location of the draggable issue item with respect to a first edge of the first workflow state column;
    obtaining a second stickiness parameter of the second workflow state column, the second stickiness parameter indicating whether the second workflow state column is selected or deselected as the current drop target for dropping the draggable issue item based, at least in part, on the current location of the draggable issue item with respect to a second edge of the second workflow state column;
    in response to the first stickiness parameter indicating that the first workflow state column is not sticky, deselecting the first workflow state column as a current drop target;
    in response to the second stickiness parameter indicating that the second workflow state column is sticky and the current location being beyond an edge of the second workflow state column, selecting the second workflow state column as the current drop target; and
    in response to the second stickiness parameter indicating that the second workflow state column is not sticky and the current location being beyond an edge of the second workflow state column, suppressing selection of the second workflow state column as the current drop target.

2. The method of claim 1, further comprising:
continuing to select the first workflow state column as the current drop target upon determining that the previous location of the draggable item was over the first workflow state column and the current location of the draggable item is not over the second workflow state column, and the first stickiness parameter of the first workflow state column is sticky.

3. The method of claim 1, further comprising:
selecting the second workflow state column as the current drop target upon determining that the previous location of the draggable item was over the first workflow state column and the current location of the draggable item is over the second workflow state column, and the first workflow state column is not related to the second workflow state column.

4. The method of claim 1, further comprising:
selecting the first and the second workflow state columns as the current drop target upon determining that the previous location of the draggable item was over the first workflow state column and the current location of the draggable item is over the second workflow state column, the first workflow state column is related to the second workflow state column, and the first stickiness parameter of the workflow state column is sticky.

5. The method of claim 1, further comprising selecting a parent workflow state column of the first workflow state column as the current drop target upon determining that:
the previous location of the draggable item was over the first workflow state column and the current location of the draggable item is not over the second workflow state column;
the first stickiness parameter of the first workflow state column is not sticky; and
a third stickiness parameter of the parent workflow state column is sticky.

6. The method of claim 1, further comprising selecting the first workflow status column and a parent workflow state column of the first workflow state column as the current drop target upon determining that:
the previous location of the draggable item was over the first workflow state column and the current location of the draggable item is not over the second workflow state column;
the first stickiness parameter of the first workflow state column is sticky; and
a third stickiness parameter of the parent workflow state column is sticky.

7. A non-transitory computer readable medium comprising instructions which when executed by a processing unit cause a browser application to:
causing display of a virtual board, the virtual board comprising a plurality of workflow state columns and a plurality of draggable issue items located within a workflow state column of the plurality of workflow state columns;
in response to a user selection of a particular draggable issue item, initiate a drag and drop operation;
determine that a previous location of the draggable item was over a first workflow state column prior to the initiation of the drag and drop operation;
determine that a current location of the draggable item is over a second workflow state column;

obtaining a first stickiness parameter of the first workflow state column, the first stickiness parameter indicating whether the first workflow state column is selected or deselected as a current drop target for dropping the draggable issue item based at least in part on the current location of the draggable issue item with respect to a first edge of the first workflow state column;
obtaining a second stickiness parameter of the second workflow state column, the second stickiness parameter indicating whether the second workflow state column is selected or deselected as the current drop target for dropping the draggable issue item based, at least in part, on the current location of the draggable issue item with respect to a second edge of the second workflow state column;
in response to the first stickiness parameter indicating that the first workflow state column is not sticky, deselecting the first workflow state column as a current drop target;
in response to the second stickiness parameter indicating that the second workflow state column is sticky and the current location being beyond an edge of the second workflow state column, selecting the second workflow state column as the current drop target; and
in response to the second stickiness parameter indicating that the second workflow state column is not sticky and the current location being beyond an edge of the second workflow state column, suppressing selection of the second workflow state column as the current drop target.

8. The non-transitory computer readable medium of claim 7, further comprising instructions which when executed by the processing unit cause the browser application to:
continue selecting the first workflow state column as the current drop target upon determining that the previous location of the draggable item was over the first workflow state column and the current location of the draggable item is not over the second workflow state column, and the first stickiness parameter of the first workflow state column is sticky.

9. The non-transitory computer readable medium of claim 7, further comprising instructions which when executed by the processing unit cause the browser application to:
select the second workflow state column as the current drop target upon determining that the previous location of the draggable item was over the first workflow state column and the current location of the draggable item is over the second workflow state column, and the first workflow state column is not related to the second workflow state column.

10. The non-transitory computer readable medium of claim 7, further comprising instructions which when executed by the processing unit cause the browser application to:
select the first and the second workflow state columns as the current drop target upon determining that the previous location of the draggable item was over the first workflow state column and the current location of the draggable item is over the second workflow state column, the first workflow state column is related to the second workflow state column, and the first stickiness parameter of the first workflow state column is sticky.

11. The non-transitory computer readable medium of claim 7, further comprising instructions which when executed by the processing unit cause the browser application to:

deselect the first workflow state column as the current drop target upon determining that:
    the previous location of the draggable item was over the first workflow state column and the current location of the draggable item is not over the second workflow state column; and
    the first workflow state column has a parent workflow state column having a third stickiness parameter that is not sticky.

12. The non-transitory computer readable medium of claim 7, further comprising instructions which when executed by the processing unit cause the browser application to:
    select a parent workflow state column of the first workflow state column as the current drop target upon determining that:
        the previous location of the draggable item was over the first workflow state column and the current location of the draggable item is not over the second workflow state column;
        the first stickiness parameter of the first workflow state column is not sticky; and
        a third stickiness parameter of the parent workflow state column is sticky.

13. The non-transitory computer readable medium of claim 7, further comprising instructions which when executed by the processing unit cause the browser application to:
    select the first workflow state column and a parent workflow state column of the first workflow state column as the current drop target upon determining that:
        the previous location of the draggable item was over the first workflow state column and the current location of the draggable item is not over the second workflow state column;
        the first stickiness parameter of the first workflow state column is sticky; and
        a third stickiness parameter of the parent workflow state column is sticky.

14. A computer system comprising:
    a processing unit;
    a browser application executing on the computer system;
    a non-transitory computer readable medium comprising instructions which when executed by the processing unit cause the browser application to:
        causing display of a virtual board, the virtual board comprising a plurality of workflow state columns and a plurality of draggable issue items located within a workflow state column of the plurality of workflow state columns;
    in response to a user selection of a particular draggable issue item, initiate a drag and drop operation;
        determine that a previous location of the draggable item was over a first workflow state column prior to the initiation of the drag and drop operation;
        determine that a current location of the draggable item is over a second workflow state column;
        obtaining a first stickiness parameter of the first workflow state column, the first stickiness parameter indicating whether the first workflow state column is selected or deselected as a current drop target based, at least in part, on the current location of the draggable issue item with respect to a first edge of the first workflow state column;
        obtaining a second stickiness parameter of the second workflow state column, the second stickiness parameter indicating whether the second workflow state column is selected or deselected as the current drop target based, at least in part, on the current location of the draggable issue item with respect to a second edge of the second workflow state column;
        in response to the first stickiness parameter indicating that the first workflow state column is not sticky, deselecting the first workflow state column as a current drop target;
        in response to the second stickiness parameter indicating that the second workflow state column is sticky and the current location being beyond an edge of the second workflow state column, selecting the second workflow state column as the current drop target; and
        in response to the second stickiness parameter indicating that the second workflow state column is not sticky and the current location being beyond an edge of the second workflow state column, suppressing selection of the second workflow state column as the current drop target.

15. The computer system of claim 14, wherein the non-transitory computer readable medium further comprising instructions which when executed by the processing unit cause the browser application to:
    continue selecting the first workflow state column as the current drop target upon determining that the previous location of the draggable item was over the first workflow state column and the current location of the draggable item is not over the second workflow state column, and the first stickiness parameter is sticky.

16. The computer system of claim 14, wherein the non-transitory computer readable medium further comprising instructions which when executed by the processing unit cause the browser application to:
    select the first and the second workflow state columns as the current drop target upon determining that the previous location of the draggable item was over the first drop workflow state column and the current location of the draggable item is over the second workflow state column, the first workflow state column is related to the second workflow state column, and the first workflow state column is sticky.

17. The computer system of claim 14, wherein the non-transitory computer readable medium further comprising instructions which when executed by the processing unit cause the browser application to:
    select a parent workflow state column of the first workflow state column as the current drop target upon determining that:
        the previous location of the draggable item was over the first workflow state column and the current location of the draggable item is not over the second stickiness parameter;
        the first stickiness parameter of the first workflow state column is not sticky; and
        a third stickiness parameter of the parent workflow state column is sticky.

18. The computer system of claim 14, wherein the non-transitory computer readable medium further comprising instructions which when executed by the processing unit cause the browser application to:
    select the first workflow state column and a parent workflow state column of the first workflow state column as the current drop target upon determining that:
        the previous location of the draggable item was over the first workflow state column and the current location of the draggable item is not over the second workflow state column;

the first stickiness parameter of the first workflow state column is sticky; and a third stickiness parameter of the parent workflow state column is sticky.

\* \* \* \* \*